US007826962B2

(12) United States Patent
Ushijima et al.

(10) Patent No.: US 7,826,962 B2
(45) Date of Patent: Nov. 2, 2010

(54) ELECTRONIC CONTROL APPARATUS

(75) Inventors: Kosuke Ushijima, Chita (JP); Fujiki Yamada, Aichi-ken (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 902 days.

(21) Appl. No.: 11/472,998

(22) Filed: Jun. 23, 2006

(65) Prior Publication Data

US 2006/0293833 A1    Dec. 28, 2006

(30) Foreign Application Priority Data

Jun. 23, 2005    (JP)    ............................ 2005-183833

(51) Int. Cl.
*F02D 41/22*    (2006.01)
*F02D 41/26*    (2006.01)
*B60T 8/32*    (2006.01)
*B60T 8/88*    (2006.01)

(52) U.S. Cl. ........................... 701/114; 701/29; 701/31; 701/97; 701/99; 701/107; 702/58; 714/51

(58) Field of Classification Search ......... 701/102–115, 701/29, 31, 97, 99; 702/58; 714/51
See application file for complete search history.

(56) References Cited

U.S. PATENT DOCUMENTS

| | | | | |
|---|---|---|---|---|
| 4,748,566 | A | * | 5/1988 | Sasaki et al. ................. 701/114 |
| 5,142,684 | A | * | 8/1992 | Perry et al. .................. 713/320 |
| 5,436,837 | A | | 7/1995 | Gerstung et al. |
| 5,602,736 | A | * | 2/1997 | Toya et al. ..................... 701/45 |
| 5,880,568 | A | * | 3/1999 | Bederna et al. ............. 318/563 |
| 6,125,322 | A | | 9/2000 | Bischof et al. |
| 6,230,094 | B1 | | 5/2001 | Ohashi et al. |

(Continued)

FOREIGN PATENT DOCUMENTS

DE    37 28 561    3/1989

(Continued)

OTHER PUBLICATIONS

German Office Action, dated Aug. 4, 2008, issued in corresponding German Appln. No. 10 2006 028 992.7-55 with English translation.

(Continued)

*Primary Examiner*—Khoi Tran
*Assistant Examiner*—Dale Moyer
(74) *Attorney, Agent, or Firm*—Nixon & Vanderhye PC

(57) ABSTRACT

The electronic control apparatus includes a microcomputer having a control function of controlling an actuator mounted on a vehicle in accordance with an input signal indicative of a running state of the vehicle, and a self-monitoring function of monitoring whether or not the control function is functioning properly on the basis of the input signal, and a monitor module communicably connected to the microcomputer and having a digital circuit for monitoring whether or not the self-monitoring function is functioning properly. The monitor module includes a reference counter counting up a clock serving as operation reference of the digital circuit. The microcomputer includes a module monitoring section configured to take in a count value of the reference counter and to monitor whether or not the monitor module is functioning properly on the basis of a changing state of the count value taken in.

16 Claims, 16 Drawing Sheets

U.S. PATENT DOCUMENTS

| | | |
|---|---|---|
| 6,805,094 B2 | 10/2004 | Hashimoto et al. |
| 7,013,241 B2 | 3/2006 | Yamada |
| 2004/0148036 A1 | 7/2004 | Sunami |
| 2004/0153886 A1* | 8/2004 | Schumacher et al. .......... 714/55 |
| 2004/0172580 A1 | 9/2004 | Kabune et al. |
| 2004/0254766 A1 | 12/2004 | Ito |

FOREIGN PATENT DOCUMENTS

| | | |
|---|---|---|
| DE | 19609242 | 9/1997 |
| DE | 100 56 408 | 3/2002 |
| DE | 10 2004 009 359 | 9/2004 |
| EP | 0 512 240 | 11/1992 |
| EP | 0 663 324 | 12/1994 |
| JP | H05-147477 | 6/1993 |
| JP | H05-208671 | 8/1993 |
| JP | H06-138000 | 5/1994 |
| JP | 10-187501 | 7/1998 |
| JP | H11-505587 | 5/1999 |
| JP | 11-294252 | 10/1999 |
| JP | 2000-152402 | 5/2000 |
| JP | 2003-343326 | 12/2003 |
| JP | 2004-225635 | 8/2004 |
| JP | 2004-227346 | 8/2004 |
| JP | 2004-234039 | 8/2004 |
| JP | 2004-259137 | 9/2004 |
| JP | 2004-318672 | 11/2004 |
| JP | 2004-346746 | 12/2004 |

OTHER PUBLICATIONS

Japanese Office Action dated May 12, 2009, issued in corresponding Japanese Application No. 2005-183833, with English translation.

Japanese Office Action dated Oct. 13, 2009, issued in corresponding Japanese Application No. 2005-183833, with English translation.

* cited by examiner

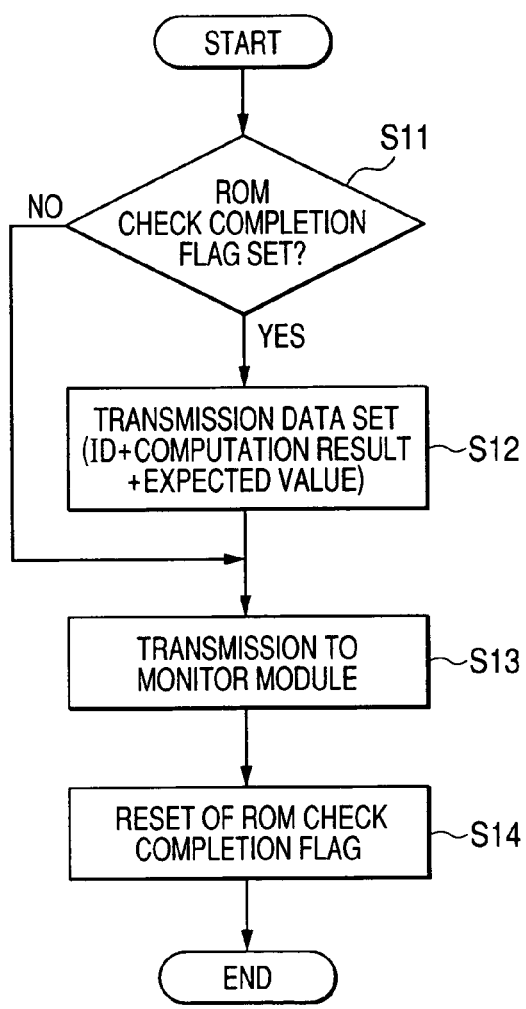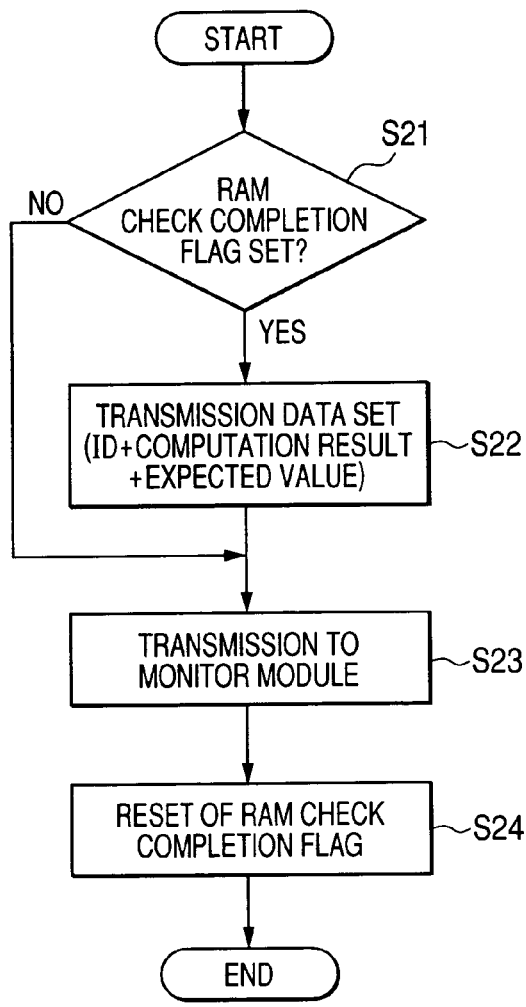

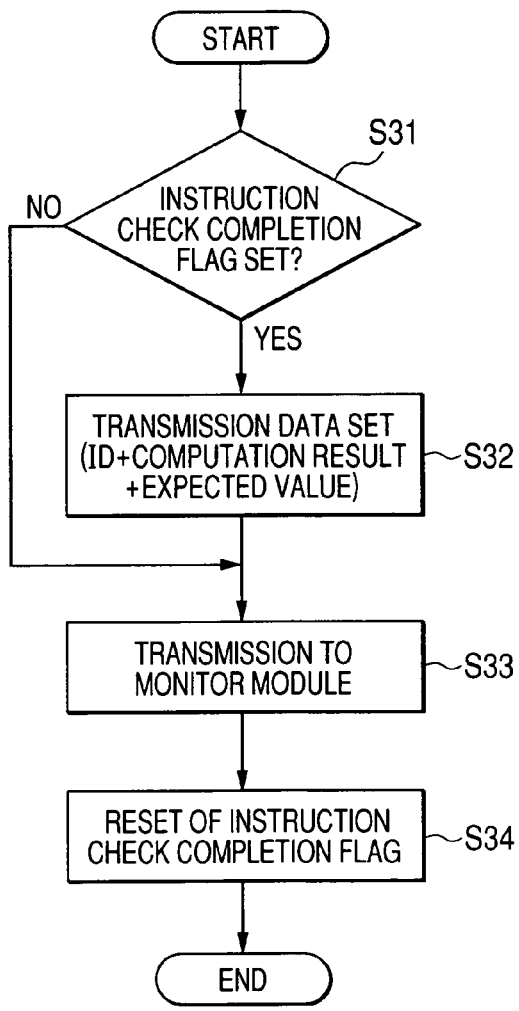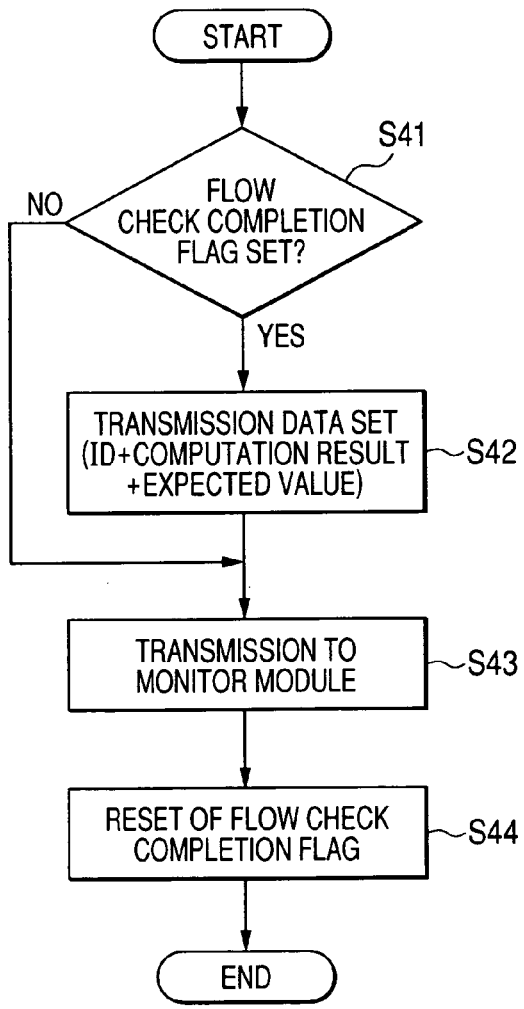

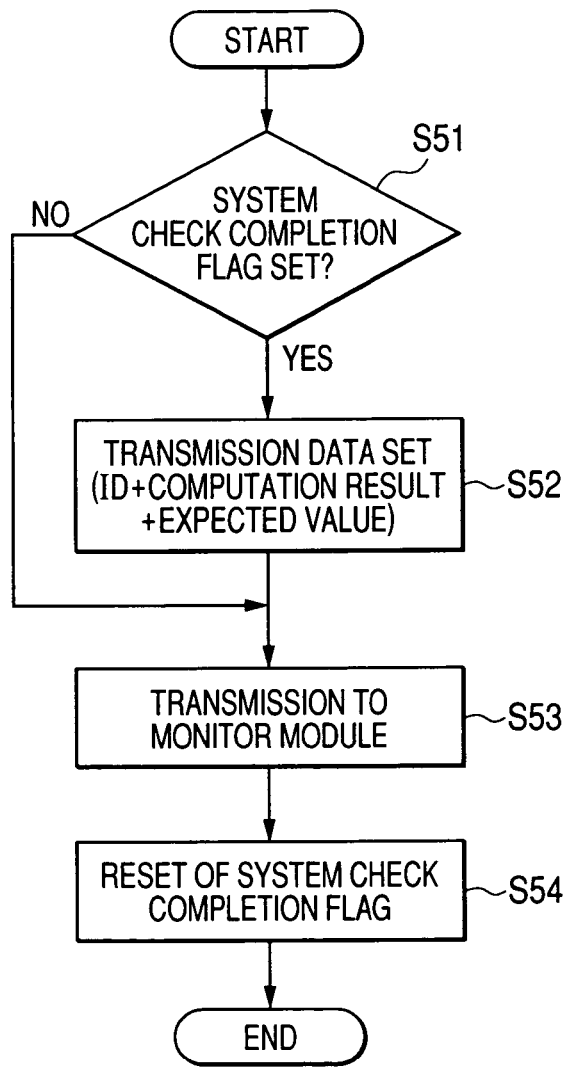

ELECTRONIC CONTROL APPARATUS

CROSS-REFERENCE TO RELATED APPLICATION

This application is related to Japanese Patent Application No. 2005-183833 filed on Jun. 23, 2005, the contents of which are hereby incorporated by reference.

BACKGROUND OF THE INVENTION

1. Field of the Invention

The present invention relates to an electronic control apparatus used, for example, for controlling operation of a vehicle-mounted actuator such as a throttle valve actuator, more particularly to an electronic control apparatus having a self-monitoring function and also a function of monitoring this self-monitoring function by use of a monitor module, the self-monitoring function being configured to self-monitor a drive command sent from a microcomputer of the electronic control apparatus to a drive circuit of a vehicle-mounted actuator.

2. Description of Related Art

Such an electronic control apparatus is described, for example, in Published Japanese Translation No. 11-505587 of a PCT Application. FIG. 22 is a block diagram showing a typical structure of an electronic control apparatus of the type described above.

As shown in this figure, the electronic control apparatus, which is used, for example, for controlling an actuator (motor) for opening and closing a throttle valve, is constituted mainly by a microcomputer 10, a monitor module 20, and a drive circuit 30.

The microcomputer 10, which is for performing various computations necessary for controlling the actuator (electric motor), has an input section 11, a control section 12, a self-monitoring section 13, a program executing section 14, and a communication section 15 as shown in FIG. 22. To control the actuator, the control section 12 takes in an external signal representing a depressed amount of a gas pedal etc. through the input section 11 which serves to mediate information exchange between the control section 12 and external sensors or devices (not shown). The control section 12 performs computation on the external signal to produce a controlled variable (control amount) by which the actuator controls the throttle valve. The computed controlled variable is outputted to the drive circuit 30 as a drive command.

The external signal is also taken in by the self-monitoring section 13 which serves to monitor the operation of the control section 12. The self-monitoring section 13 performs computation similar to that performed by the control section 12. The result of the computation in the self-monitoring section 13 is compared with the drive command outputted from the control section 12. The result of the comparison is supplied to the drive circuit 30 as a signal (information) indicative of validity of the drive command.

The program executing section 14 is for executing in cooperation with the monitor module 20 a monitoring program in order to monitor abnormality in the self-monitoring section 13. The program executing section 14 starts executing the monitoring program upon receiving a test signal from the monitor module 20 through the communication section 15 included in the microcomputer 10. More specifically, the program executing section 14 outputs a certain data set designated by the monitoring program to the self-monitoring section 13. After that, the program executing section 14 takes in the result of the computation on the data set performed by the self-monitoring section 13, and sends it to the monitor module 20 through the communication section 15. The communication section 15 of the microcomputer 10 is a section for mediating information exchange with a communication section 22 of the monitor module 20 by serial communication.

The monitor module 20 constituted by the communication section 22 and an abnormality determining circuit 21 is formed as a custom IC or a backup computer configured to monitor abnormality in the self-monitoring section 13 on the basis of information sent from the program executing section 14 through the communication section 15 and the communication section 22.

To monitor the self-monitoring section 13, the abnormality determining circuit 21 takes in the result of the computation on the certain data set sent from the program executing section 14 of the microcomputer 10. And the abnormality determining circuit 21 compares this computation result with an expected value stored therein. The result of the comparison is supplied to the drive circuit 30 as a monitoring result on the self-monitoring section 13. The abnormality determining circuit 21 also serves to output the test signal to the program executing section 14 of the microcomputer 10 at regular time intervals.

The drive circuit 30 is a section for driving the actuator to open and close the throttle valve in accordance with the drive command received from the control section 12 under normal condition, although it receives other signals from the self-monitoring section 13 and the abnormality determining circuit 21. However, when the signal received from the self-monitoring section 13 indicates inconsistency between the drive command outputted from the control section 12 and the result of the computation by the self-monitoring section 13, or when the signal received from the abnormality determining circuit 21 indicates inconsistency between the result of the computation on the certain data set and the expected value, the reliability of the drive command outputted from the control section 12 to the drive circuit 30 is low. Accordingly, in such cases, the drive circuit 30 performs a fail-safe process negating the drive command received from the control section 12 to ensure vehicle safety.

With the electronic control apparatus of the type having the self-monitoring function for monitoring the drive command and also the function of further monitoring the self-monitoring function as described above, the reliability of the throttle valve control can be greatly improved. However, even in the electronic control apparatus of such type, if the monitor module itself develops a problem, the reliability of the throttle valve control cannot be ensured.

SUMMARY OF THE INVENTION

The present invention provides an electronic control apparatus including:

a microcomputer having a control function of controlling an actuator mounted on a vehicle in accordance with an input signal indicative of a running state of the vehicle, and a self-monitoring function of monitoring whether or not the control function is functioning properly on the basis of the input signal;

a monitor module communicably connected to the microcomputer and having a digital circuit for monitoring whether or not the self-monitoring function is functioning properly;

Wherein the monitor module includes a reference counter counting up a clock serving as an operation reference for the monitor module digital circuit, and the microcomputer includes a module monitoring section configured to take in a count value of the reference counter and to monitor whether or not the monitor module is functioning properly on the basis of a changing state of the count value taken in.

In the electronic control apparatus of the invention, the module monitoring section monitors the count value of the reference counter counting up the clock serving as an operation reference for the digital circuit of the monitor module. This makes it possible for the microcomputer to indirectly monitor the digital circuit of the monitor module in order to make a judgment as to whether or not the monitor module itself is in an inoperable state in which it cannot perform the monitoring operation.

Other advantages and features will become apparent from the following description including the drawings and claims.

BRIEF DESCRIPTION OF THE DRAWINGS

In the accompanying drawings:

FIG. 7 is a flowchart showing a transmission process for transmitting a computation result and its expected value at the time of performing the ROM check;

FIG. 8 is a flowchart showing a transmission process for transmitting a computation result and its expected value at the time of performing the RAM check;

FIG. 9 is a flowchart showing a transmission process for transmitting a computation result and its expected value at the time of performing the instruction check;

FIG. 10 is a flowchart showing a transmission process for transmitting a computation result and its expected value at the time of performing the flow check;

FIG. 11 is a flowchart showing a transmission process for transmitting a computation result and its expected value at the time of performing the system check;

FIG. 12 is a diagram showing a data structure of data transmitted from a communication section of a microcomputer included in the electronic control apparatus;

PREFERRED EMBODIMENTS OF THE INVENTION

First Embodiment

Figure 1:
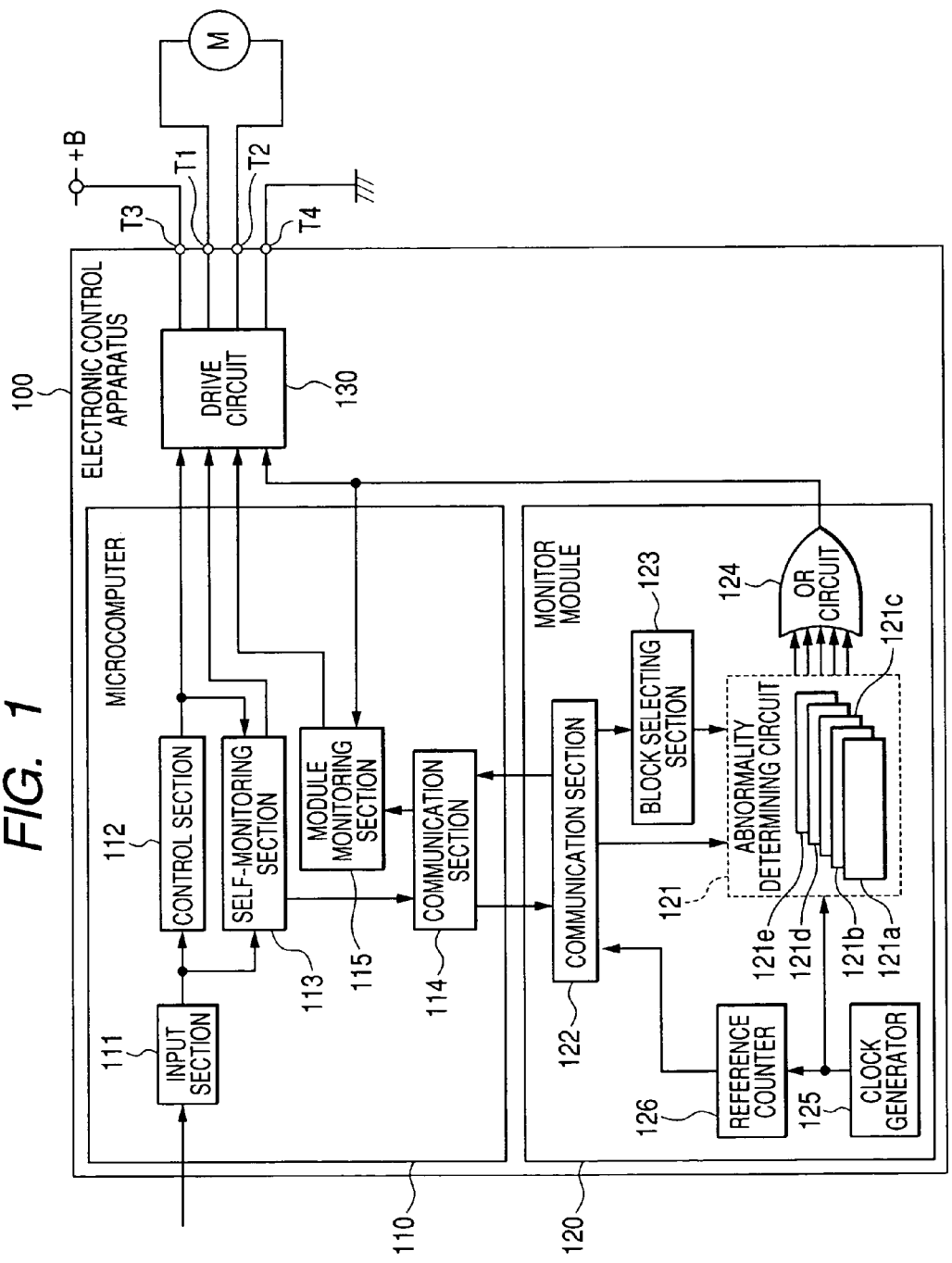
FIG. 1 is a block diagram showing an overall structure of an electronic control apparatus according to a first embodiment of the invention.

FIG. 1 is a block diagram showing an overall structure of an electronic control apparatus 100 according to a first embodiment of the invention.

As shown in this figure, the electronic control apparatus 100, which is for controlling a motor M as an actuator for driving a throttle valve (not shown) by adjusting a current supplied from output terminals T1 and T2 thereof to the motor M, is mainly constituted by a microcomputer 110, a monitor module 120, and a drive circuit 130. The electronic control apparatus 100 is supplied with electric power from a vehicle battery through a power supply terminal T3 and a ground terminal T4 thereof.

The microcomputer 110, which is for performing various computations necessary for controlling the motor M, has an input section 111, a control section 112, a self-monitoring section 113, a communication section 114, and a module monitoring section 115 as shown in FIG. 1.

To control the motor M, the control section 112 takes in an external signal indicative of a depressed amount of a gas pedal etc. through the input section 111 which serves to mediate information exchange between the control section 112 and external sensors or devices (not shown). The microcomputer 110 performs computation on this external signal to produce a controlled variable (control amount) by which the throttle valve (motor M) should be controlled. The computed controlled variable is outputted to the drive circuit 130 as a drive command. In consequence, the drive circuit 130 drives the motor M such that an opening degree of the throttle valve is in accord with the drive command (controlled variable).

The self-monitoring section 113 is a section monitoring whether or not the control section 112 is functioning properly. In this embodiment, the self-monitoring section 113 is configured to perform the below-described five monitoring processes to ensure the proper operation of the control section 112.

1. Monitoring of a Program Memory (ROM Check)

The self-monitoring section 113 monitors properness of various control programs stored in a program memory 1121 (ROM: see FIG. 2) included in the microcomputer 110 to be performed by the control section 112, and properness of various control data sets used for these control programs. The self-monitoring section 113 performs the monitoring on the program memory (ROM check) in a way described below.

Figure 2:
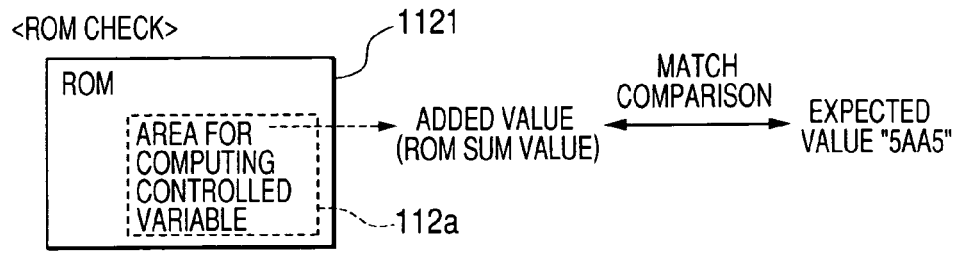
FIG. 2 is a diagram for explaining a ROM check performed by a self-monitoring section included in the electronic control apparatus.

As shown in FIG. 2, the program memory 1121 has an area 112a storing data sets used for computing the controlled variable by which the throttle valve is controlled. By summing these data sets, a certain fixed value ("5AA5", for example) is obtained as a ROM sum value. To compute the controlled variable, the self-monitoring section 113 obtains a summation value (ROM sum value) of theses data sets stored in the area 112a. The self-monitoring section 113 performs the monitoring in accordance with match comparison between the summation value and an expected value ("5AA5", for example) prestored therein.

2. Monitoring of a Data RAM (RAM Check)

The self-monitoring section 113 also monitors properness of data sets such as a duty ratio value defining the opening degree of the throttle valve written as computation results in a data RAM included in the microcomputer 110. The self-monitoring section 113 performs the monitoring of the data RAM (RAM check) in a way described below.

Figure 3:
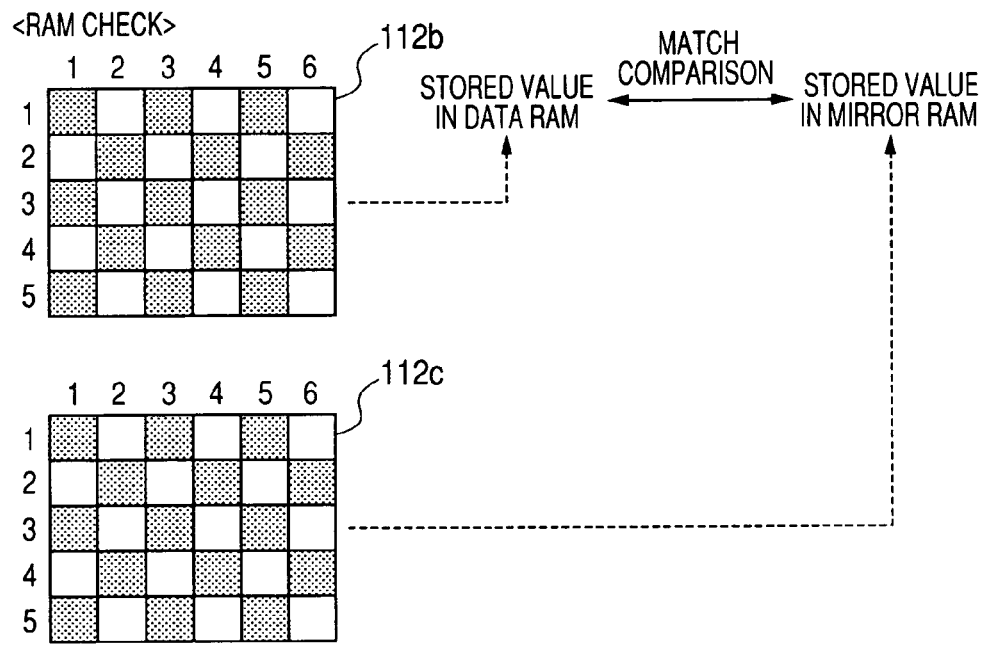
FIG. 3 is a diagram for explaining a RAM check performed by the self-monitoring section.

As shown in FIG. 3, the control section 112 stores various computation results in a certain area 112b within the data RAM and also in a certain area 112c within a mirror RAM included in the microcomputer 110. The self-monitoring section 113 reads a computation result from the data RAM and its expected value from the mirror RAM stored at corresponding addresses, respectively. The self-monitoring section 113 performs monitoring of the data RAM on the basis of consistency and inconsistency between the computation result and the expected value.

3. Monitoring of Drive Commands (Instructions) Issued from the Control Section (Instruction Check)

The self-monitoring section 113 also monitors properness of drive commands which the control section 112 issues as computation results, and various components related to the drive commands (registers, address bus, data bus, etc.).

Figure 4:
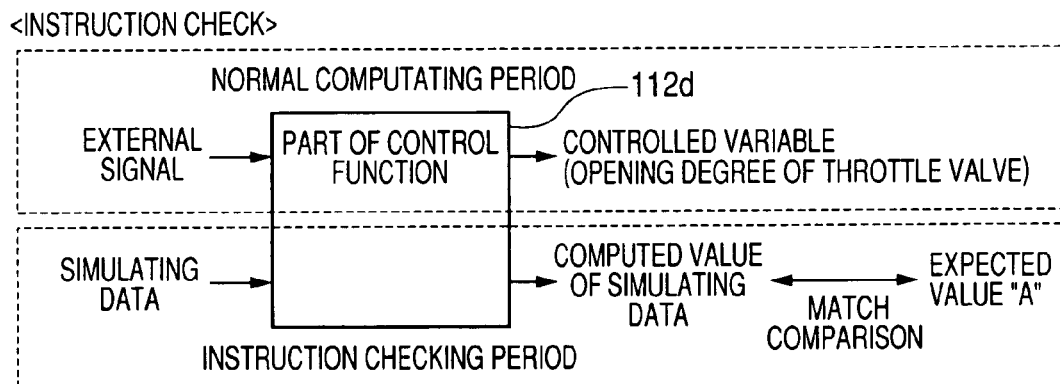
FIG. 4 is a diagram for explaining an instruction check performed by the self-monitoring section.

To start the monitoring of the drive commands, as shown in FIG. 4, a functional part 112d of the control section 112 configured to compute the opening degree of the throttle valve on the basis of the external signal received through the input section 111 reads simulating data prestored therein. Subsequently, the functional part 112d performs computation on the simulating data, and stores the result of the computation in a certain register. The self-monitoring section 113 performs the monitoring of the drive commands in accordance with match comparison between the result of the computation on the simulating data and an expected value prestored in a memory.

4. Monitoring of Function Call Order (Flow Check)

The self-monitoring section 113 monitors a call order of functions called by the control section 112 in a way described below.

Figure 5:
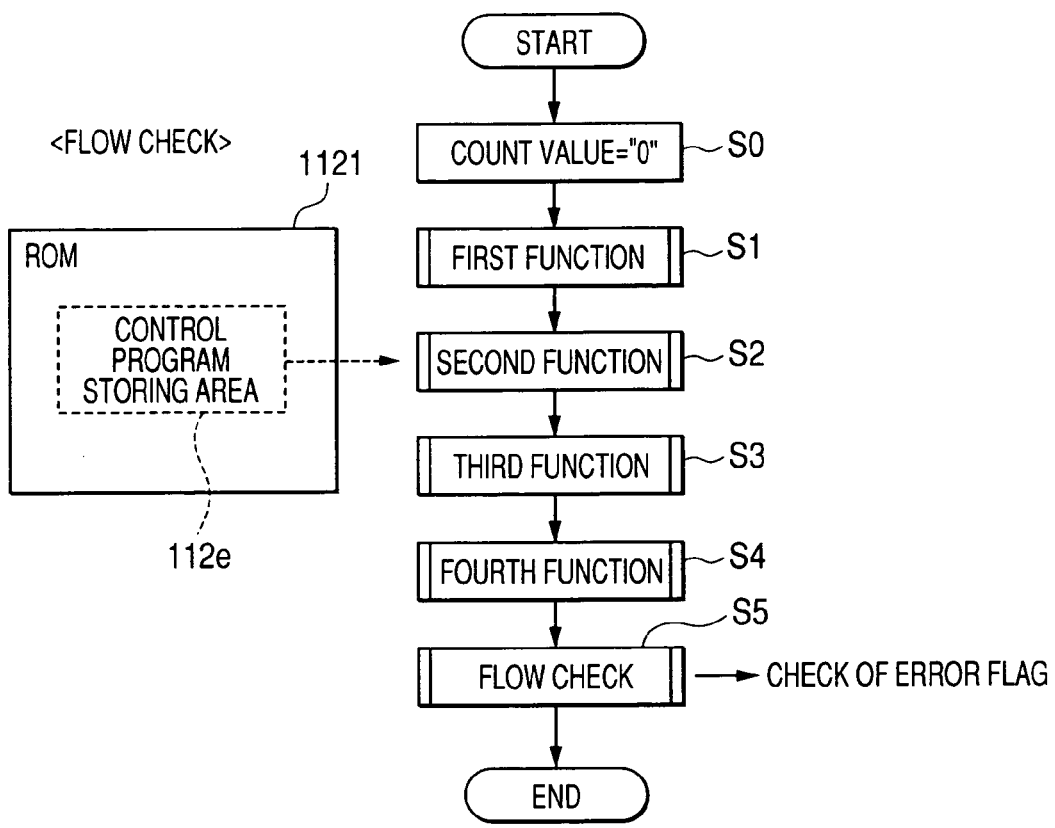
FIG. 5 is a flowchart showing a process of a flow check performed by the self-monitoring section.

As shown in FIG. 5, the program memory 1121 included in the microcomputer 110 has a control program storing area 112e in which a control program (flowchart) including steps S0 to S5 is stored. First to fourth functions used by steps S1 to S4, respectively, have to be called in this order by the control section 112. At step S0, the count value of a program counter is reset to 0 in advance of calling the first to fourth functions. Each of the first to fourth functions includes a processing for performing comparison between a count value of the program counter with a predetermined check value, and a processing for incrementing the count value of the program counter. As such a predetermined check value, "0" is used in the first function, and "1" is used in the second function, for example. If it is found at any of steps S0 to S4 that the count value of the program counter and the predetermined check value are not matched, an error flag is set. By checking the error flag at step S5, it is possible to determine whether or not the first to fourth functions have been called in the correct order.

5. Monitoring of Computed Values (System Check)

The self-monitoring section 113 monitors computed values such as the duty ratio value defining the opening degree of the throttle valve which the control section 112 has computed in accordance with the external signal received through the input section 111 in a way described below.

The microcomputer 110 includes a memory (not shown) therein which stores a map M showing a relationship between the duty ratio and the running state of the vehicle, and also a relationship between a maximum allowable duty ratio which defines a maximum allowable opening degree of the throttle valve and the running state of the vehicle. The control section 112 computes the duty ratio in accordance with the external signal indicative of the running state of the vehicle referring to the map M. The computed duty ratio value is stored in a duty ratio storing area 112f within the data RAM 1122 included in the microcomputer 110 (see FIG. 6).

To perform the monitoring of the computed value (computed duty ratio), the self-monitoring section 113 reads the duty ratio computed by the control section 112 from the data RAM 1122. Subsequently, the self-monitoring section 113 determines the maximum allowable duty ratio depending on the running state of the vehicle (external signal) referring to the map M. The self-monitoring section 113 performs the monitoring on the basis of value comparison between the maximum allowable duty ratio "x %" determined as an expected value and the duty ratio computed by the control section 112.

As explained above, the self-monitoring section 113 performs monitoring operation on the above described five different monitoring objects in an individual basis, and outputs information indicative of validity of the drive command produced by the control section 112 to the drive circuit 130 each time monitoring operation is completed. More specifically, for the monitoring items or monitoring objects to be analyzed through match comparison (ROM check, RAM check, instruction check, and flow check), the self-monitoring section 113 outputs information indicating that the drive command produced by the control section 112 is not valid when there is a disparity between a computation result and its expected value. For the monitoring item to be analyzed through value comparison (system check), the self-monitoring section 113 outputs information indicating that the drive command produced by the control section 112 is not valid when a computation result is larger than its expected value. Such information (signal) supplied to the drive circuit 130 enables the drive circuit 130 to open and close the throttle valve at higher accuracy through the motor M.

Each time a monitoring operation is completed, the self-monitoring section 113 stores a computation result and its expected value used in the monitoring operation in a certain memory for each of the five monitoring items separately. The self-monitoring section 113 also sets a check completion flag in a certain memory for each of the five monitoring items separately to indicate that the monitoring operation has been completed.

The communication section 114 of the microcomputer 110 is a section for mediating information exchange with a communication section 122 of the monitor module 120. In this embodiment, when a monitoring of the control section 112 is performed, the communication section 114 transmits a computation result depending on the content of a monitoring object and its expected value to which the computation result is expected to be equal to the monitor module 120. With the electronic control apparatus described above in which the monitoring of the control section 112 by the self-monitoring section 113 and the monitoring of the self-monitoring section 113 by the monitor module 120 are carried out concurrently, it is possible to further increase the reliability of the drive control of the throttle valve.

Next, a transmission process performed by the communication section 114 for transmitting a computation result and its expected value to the monitor module 120 is explained with reference to FIG. 7 to FIG. 11 The transmission process is carried out for each of the five monitoring items separately through serial or parallel communication. This transmission process uses a time sharing method for enabling transmitting data while other data is being transmitted.

FIG. 7 is a flow chart showing a process for transmitting a computation result and its expected value which have been used for performing the monitoring of the program memory (ROM check). This transmission process is performed at regular time intervals.

As shown in this figure, to start this transmission process, the communication section 114 checks at step S11 whether or not a ROM check completion flag has been set by the self-monitoring section 113 to indicate that the monitoring of the program memory (ROM check) has been completed. If the check result is affirmative, the process moves to step S12.

At step S12, a computation result (ROM sum value) and its expected value ("5AA5, for example") as shown in FIG. 2 are read from the certain memory as transmission data to be transmitted to the monitor module 120, with which a first register (not shown) included in the microcomputer 110 is updated. At this time, as shown in FIG. 12, the transmission data is added with an identifier (ID) to indicate that this transmission data is data related to the ROM check. The communication section 114 transmits the transmission data to the monitor module 120 at step S13. After that, the ROM check completion flag is reset (cleared) at step S14.

On the other hand, if it is determined at step S11 that the ROM check completion flag has not been set, the process moves to step S13 without performing step S12. In this case, it results that the transmission data stored in the first register and transmitted at a previous time is transmitted to the monitor module 120 again. After that, the ROM check completion flag is reset (cleared) at step S14.

FIG. 8 is a flow chart showing a process for transmitting a computation result and its expected value which have been used for performing the monitoring of the data RAM (RAM check). This transmission process is performed repeatedly at regular time intervals as in the case of the transmission process shown in FIG. 7.

As shown in FIG. 8, to start this transmission process, the communication section 114 checks at step S21 whether or not a RAM check completion flag has been set by the self-monitoring section 113 to indicate that the RAM check has been completed. If the check result is affirmative, the process moves to step 322.

At step S22, a computation result (a stored value in the data RAM) and its expected value (a stored value in the mirror RAM) as shown in FIG. 3 are read from the certain memory as transmission data to be transmitted to the monitor module 120, with which a second register (not shown) included in the microcomputer 110 is updated. At this time, as shown in FIG. 12, this transmission data is added with an identifier (ID) to indicate that this transmission data is data related to the RAM check. After that, the transmission data thus produced (FIG. 12) is transmitted to the monitor module 120 at step S23. Subsequently, the RAM check completion flag is reset (cleared) at step S24.

On the other hand, if it is determined at step S21 that the RAM check completion flag has not been set, since it means that the RAM check has not been completed yet, the process moves to step S23 without performing step S22. In this case, it results that the transmission data stored in the second register and transmitted at a previous time is transmitted to the monitor module 120 again. After that, the RAM check operation competition flag is reset (cleared) at step S24.

FIG. 9 is a flowchart showing a process for transmitting a computation result and its expected value which have been used for performing the monitoring of the drive command produced by the control section 112 (instruction check). This transmission process is performed repeatedly at regular time intervals as in the case of the transmission process shown in FIG. 7.

As shown in FIG. 9, to start this transmission process, the control section 114 checks at step S31 whether or not an instruction check completion flag has been set by the self-monitoring section 113 to indicate that the instruction check has been completed. If the check result is affirmative, the process moves to step S32.

At step S32, a computation result (a computed value of the simulating data) and its expected value ("A", for example) as shown in FIG. 4 are read from the certain memory as transmission data to be transmitted to the monitor module 120, with which a third register (not shown) included in the microcomputer 110 is updated. At this time, as shown in FIG. 12, this transmission data is added with an identifier (ID) to indicate that this transmission data is data related to the instruction check. After that, the transmission data thus produced (FIG. 12) is transmitted to the monitor module 120 at step S33. Subsequently, the instruction check completion flag is reset (cleared) at step S34.

On the other hand, if it is determined at step S31 that the instruction check completion flag has not been set, since it means that the instruction check has not been completed yet, the process moves to step 533 without performing step S32. In this case, it results that the transmission data stored in the third register and transmitted at a previous time is transmitted to the monitor module 120 again. After that, the instruction check completion flag is reset (cleared) at step S34.

FIG. 10 is a flowchart showing a process for transmitting a computation result and its expected value which have been used for performing the monitoring of the call order (flow check). This transmission process is performed repeatedly at regular time intervals as in the case of the transmission process shown in FIG. 7.

As shown in FIG. 10, to start this transmission process, the communication section 114 checks at step S41 whether or not a flow check completion flag has been set to indicate that the instruction check has been completed. If the check result is affirmative, the process moves to step S42.

At step S42, a computation result (a counter value) and its expected value ("4", for example) as shown in FIG. 5 are read from the certain memory as transmission data to be transmitted to the monitor module 120, with which a fourth register (not shown) included in the microcomputer 110 is updated. At this time, as shown in FIG. 12, this transmission data is added with an identifier (ID) to indicate that this transmission data is data related to the flow check. After that, the transmission data thus produced (FIG. 12) is transmitted to the monitor module 120 at step S43. Subsequently, the flow check completion flag is reset (cleared) at step S44.

On the other hand, if it is determined at step S41 that the flow check completion flag has not been set, since it means that the flow check has not been completed yet, the process moves to step S43 without performing step S42. In this case, it results that the transmission data stored in the fourth register and transmitted at a previous time is transmitted to the monitor module 120 again. After that, the flow check completion flag is reset (cleared) at step S44.

FIG. 11 is a flowchart showing a process for transmitting a computation result and its expected value which have been used for performing the monitoring of computed values produced by the control section 112 (system check). This transmission process is performed repeatedly at regular time intervals as in the case of the transmission process shown in FIG. 7.

As shown in FIG. 11, to start this transmission process, the communication section 114 checks at step S51 whether or not a system check completion flag has been set to indicate that the instruction check has been completed. If the check result is affirmative, the process moves to step S52.

Figure 6:
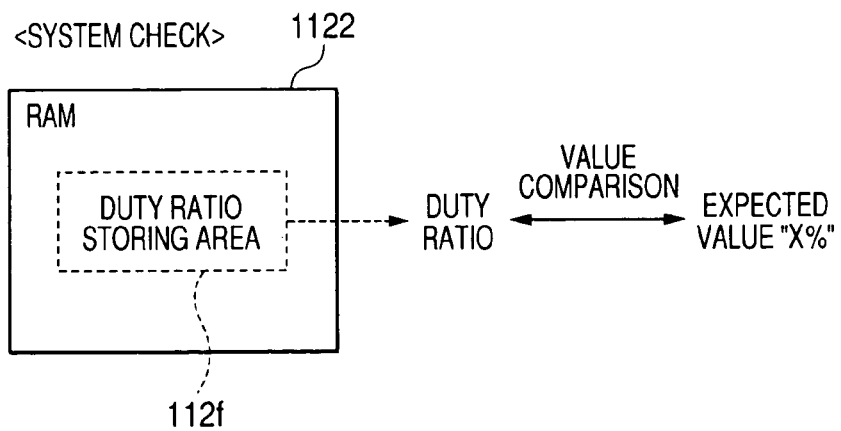
FIG. 6 is a diagram for explaining a system check performed by the self-monitoring section.

At step S52, the computation result (the duty ratio) and its expected value "x %" as shown in FIG. 6 are read from the certain memory as transmission data to be transmitted to the monitor module 120, with which a fifth register (not shown) included in the microcomputer 110 is updated. At this time, as shown in FIG. 12, this transmission data is added with an identifier (ID) to indicate that this transmission data is data related to the system check. After that, the transmission data thus produced (FIG. 12) is transmitted to the monitor module 120 at step S53. Subsequently, the system check completion flag is reset (cleared) at step S54.

On the other hand, if it is determined at step S51 that the system check completion flag has not been set, since it means that the system check has not been completed yet, the process moves to step S53 without performing step S52. In this case, it results that the transmission data stored in the fifth register and transmitted at a previous time is transmitted to the monitor module 120 again. After that, the system check completion flag is reset (cleared) at step S54.

As explained above, in this embodiment, a computation result and its expected value are transmitted to the monitor module 120 for each of the five different monitoring items separately. The monitor module 120 monitors whether or not the self-monitoring section 113 is functioning properly on the basis of the data transmitted from the microcomputer 110 as described later. Thus, the monitoring operation on the control section 112 by the self-monitoring section 113 and the monitoring operation on the control section 113 by the monitor module 120 are carried out concurrently, to thereby further increase the reliability of the drive control of the throttle valve.

The module monitoring section 115 of the microcomputer 110 is a section for monitoring whether or not the monitor module 120 is functioning properly on the basis of the information transmitted from the monitor module 120. More specifically, the module monitoring section 115 monitors whether or not digital circuit blocks 121a to 121e (to be described later) included in the monitor module 120 are functioning properly in accordance with a clock which serves as operation reference of the monitor module 120. The module monitoring section 115 is explained in detail later.

The monitor module 120 is a hardware module (custom IC) for monitoring abnormality in the self-monitoring section 113 on the basis of the data transmitted from the microcomputer 110 such as shown in FIG. 12

As explained above, the monitor module 120 takes in the data as shown in FIG. 12 transmitted from the microcomputer 110 through the communication section 122 thereof. The computation result and its expected value included in this data are supplied to an abnormality determining circuit 121. The abnormality determining circuit 121 performs comparison between them to determine whether or not abnormality is in the self-monitoring section 113. The abnormality determining circuit 121 operates on a clock serving as operation reference generated by a clock generator 125.

The abnormality determining circuit 121 of the monitor module 120 includes five digital circuit blocks 121a to 121e corresponding to the above-described five monitoring items. The abnormality determining circuit 121 further includes a block selecting section 123 configured to supply the computation result and its expected value included in the transmitted data to one of the digital circuit blocks 121a to 121e, which is associated with the identifier (ID) added to this transmitted data.

Next, the structure and the operation of the digital circuit block 121a is explained in detail with reference to FIG. 13.

Here, it is assumed that the block selecting section 123 selects the digital circuit block 121a on the basis of the identifier added to the transmission data received in the communication section 122, and supplies the computation result and its expected value included in this transmission data to the digital circuit block 121a. In this case, the digital circuit block 121a stores the computation result and its expected value in an A-register 151 and a B-register 152, respectively. Subsequently, a match comparison between the computation result and its expected value is performed by a first comparator 153. More specifically, the first comparator 153 performs a match comparison between the computation result (ROM sum value) and its expected value ("5AA5", for example) as shown in FIG. 2. The result of this match comparison is used to determine whether or not the self-monitoring section 113 has performed the ROM check properly.

The digital circuit block 121a is provided with the below described components to prevent the monitoring function of the microcomputer 110 from being judged to be in an abnormal state, when the computation result and its expected value become inconsistent with each other accidentally due to noise, for example. A data abnormality counter 154 configured to count up the clock generated by the clock generator 125, and to be cleared upon receiving from the first comparator 153 a signal indicative of the computation result and its expected value being matched with each other. A second comparator 156 configured to perform a value comparison between the count value of the data abnormality counter 154 and a certain threshold value stored in a memory 155, and to output a result of the value comparison as a monitoring result of abnormality in the self-monitoring section 113.

These components enable determining that the self-monitoring section 113 is not functioning properly where the count value of the data abnormality counter 154 exceeds the threshold value prestored in the memory 155, that is, when a state in which the computation result and its expected value are not matched with each other lasts for more than a predetermined threshold time. This increases reliability of monitoring abnormality in the self-monitoring section 113.

Incidentally, the electronic control apparatus 100 configured as described above has a possibility that the reliability of the drive control of the throttle valve is lowered by contraries, if there is abnormality in communication operation between the microcomputer 110 and the monitor module 120, and therefore the monitoring function of the microcomputer 110 cannot be sufficiently monitored by the monitor module 120. Accordingly, the digital circuit block 121a further includes the following components. A communication abnormality counter 157 configured to count up the clock generated by the clock generator 125, and to be cleared upon receiving a signal which the communication section 122 outputs when this communication section 122 receives information from the microcomputer 110. A third comparator 156 configured to perform a value comparison between the count value of the communication abnormality counter 157 and a certain threshold value stored in the memory 158, and to output a result of the value comparison as a monitoring result of abnormality in the communication operation between the microcomputer 110 and the monitor module 120.

These components enable determining that there is abnormality in the communication operation when the count value of the communication abnormality counter 157 exceeds the threshold value prestored in the memory 158, that is, when a state in which the computation result and its expected value are not matched with each other lasts for more than a predetermined threshold time. This increases reliability of monitoring abnormality in the self-monitoring section 113.

Next, an abnormality determining process performed by the digital circuit block 121a for determining abnormality in the self-monitoring section 113 is explained with reference to the flowchart shown in FIG. 14.

Figure 14:
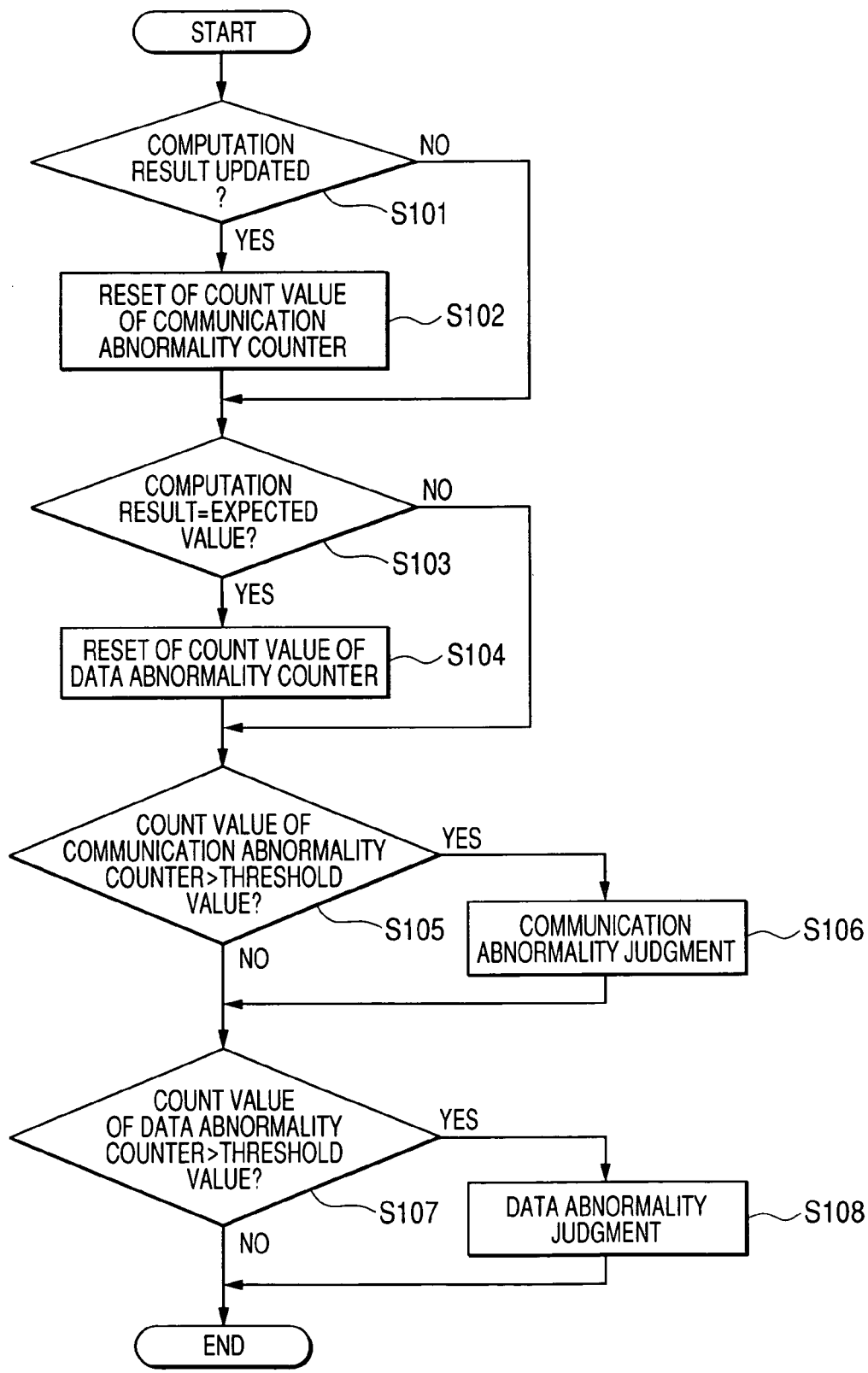
FIG. 14 is a flowchart showing an abnormality determining process for determining abnormality in the self-monitoring section performed by digital circuit blocks included in the monitor module and configured to perform match comparison.

As shown in FIG. 14, the abnormality determining process begins by checking at step S101 whether or not the data (computation result and its expected value) stored in the registers 151, 152 of the digital circuit block 121a has been updated. If the check result is affirmative, the counter value of the communication abnormality counter 157 is cleared at step S102, and then the process moves to step S103. If the check result at step S101 is negative, the process moves to step S103 without performing step S102, that is, without clearing the count value of the communication abnormality counter 157.

At step S103, a match comparison between the computation result and its expected value stored in the registers 151, 152, respectively, is performed by the first comparator 153. If it is determined that the computation result and its expected value match with each other, the count value of the data abnormality counter 154 is cleared at step S104, and then the process moves to step S105. On the other hand, if it is determined at step S103 that the computation result and its expected value do not match with each other, the process moves to step S105 without performing step S104, that is, without clearing the count value of the data abnormality counter 154.

After the communication abnormality counter 157 and the data abnormality counter 154 have been adjusted in this way, propernesses of their count values are checked at step S105 and step S107 in succession.

More specifically, at step S105, a value comparison between the count value of the communication abnormality counter 157 and the threshold value stored in the memory 158 is performed. If it is determined at step S105 that the count value of the communication abnormality counter 157 exceeds the threshold value, since it means that a state over which the computation result and its expected value are not received has lasted for more than the predetermined threshold time, it is judged at step S106 that there is abnormality in the communication operation.

At step S107, a value comparison between the count value of the data abnormality counter 154 and the threshold value stored in the memory 155 is performed. If it is determined at step S107 that the count value of the data abnormality counter 154 exceeds the threshold value, since it means that a state in which the computation result and its expected value do not match with each other has lasted for more than the predetermined threshold time, it is judged at step S108 that there is abnormality in the self-monitoring section 113.

Figure 13:
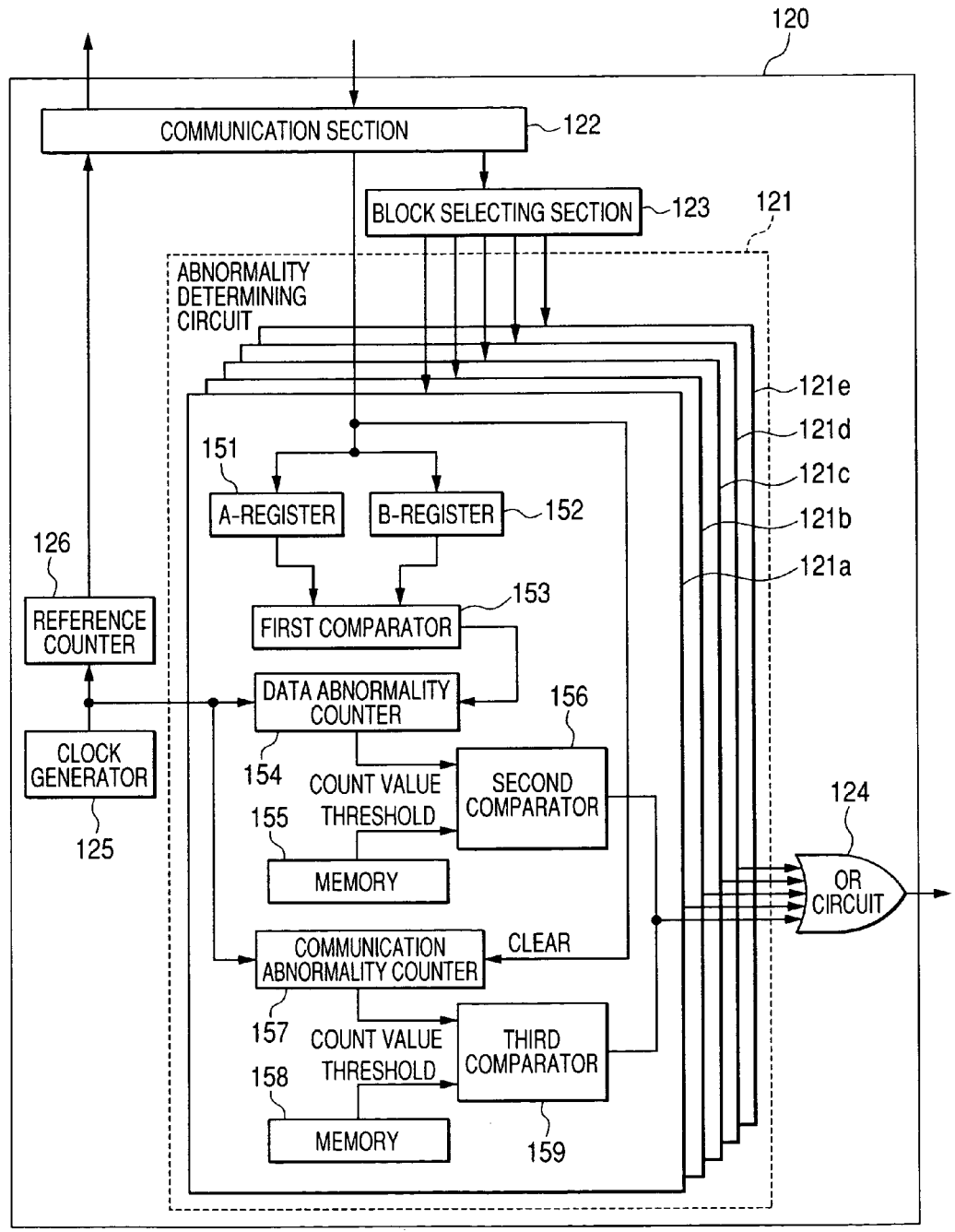
FIG. 13 is a block diagram showing an internal structure of a monitor module included in the electronic control apparatus.

Although not shown in the interest of simplicity, the digital circuit block 121b has a structure similar to that of the digital circuit block 121a shown in FIG. 13. Accordingly, the abnormality determining process performed by the digital circuit block 121b is similar to the process (FIG. 14) performed by the digital circuit block 121a However, in the digital circuit block 121b, the computation result (the stored value in the data RAM) as shown in FIG. 3 and its expected value (the stored value in the mirror RAM) are respectively stored in two registers equivalent to the registers 151, 152. Accordingly, a match comparison between the computation result (the stored value in the data RAM) and its expected value (the stored value in the mirror RAM) is performed by a comparator included in the digital circuit block 121b, which is equivalent to the first comparator 153.

In the digital circuit block 121c, the computation result (the computed value of the simulating data) and its expected value ("A", for example) as shown in FIG. 4 are respectively stored in two registers equivalent to the registers 151, 152. Accordingly, a match comparison between the computation result (the computed value of the simulating data) and its expected value ("A", for example) is performed by a comparator included in the digital circuit block 121c, which is equivalent to the first comparator 153.

In the digital circuit block 121d, the computation result (the count value) and its expected value ("4", for example) as shown in FIG. 5 are respectively stored in two registers equivalent to the registers 151, 152. Accordingly, a match comparison between the computation result (the count value) and its expected value ("4", for example) is performed by a comparator included in the digital circuit block 121d, which is equivalent to the first comparator 153.

The digital circuit block 121e has a structure similar to that of the digital circuit block 121a shown in FIG. 13. However, in the digital circuit block 121e, a value comparison between the computation result (the duty ratio) and its expected value (the maximum allowable duty ratio "x %") is performed by a comparator equivalent to the first comparator 153 to determine abnormality in the self-monitoring section 113.

Next, the abnormality determining process performed by the digital circuit block 121e for determining abnormality in the self-monitoring section 113 is explained with reference to the flowchart shown in FIG. 15.

Figure 15:
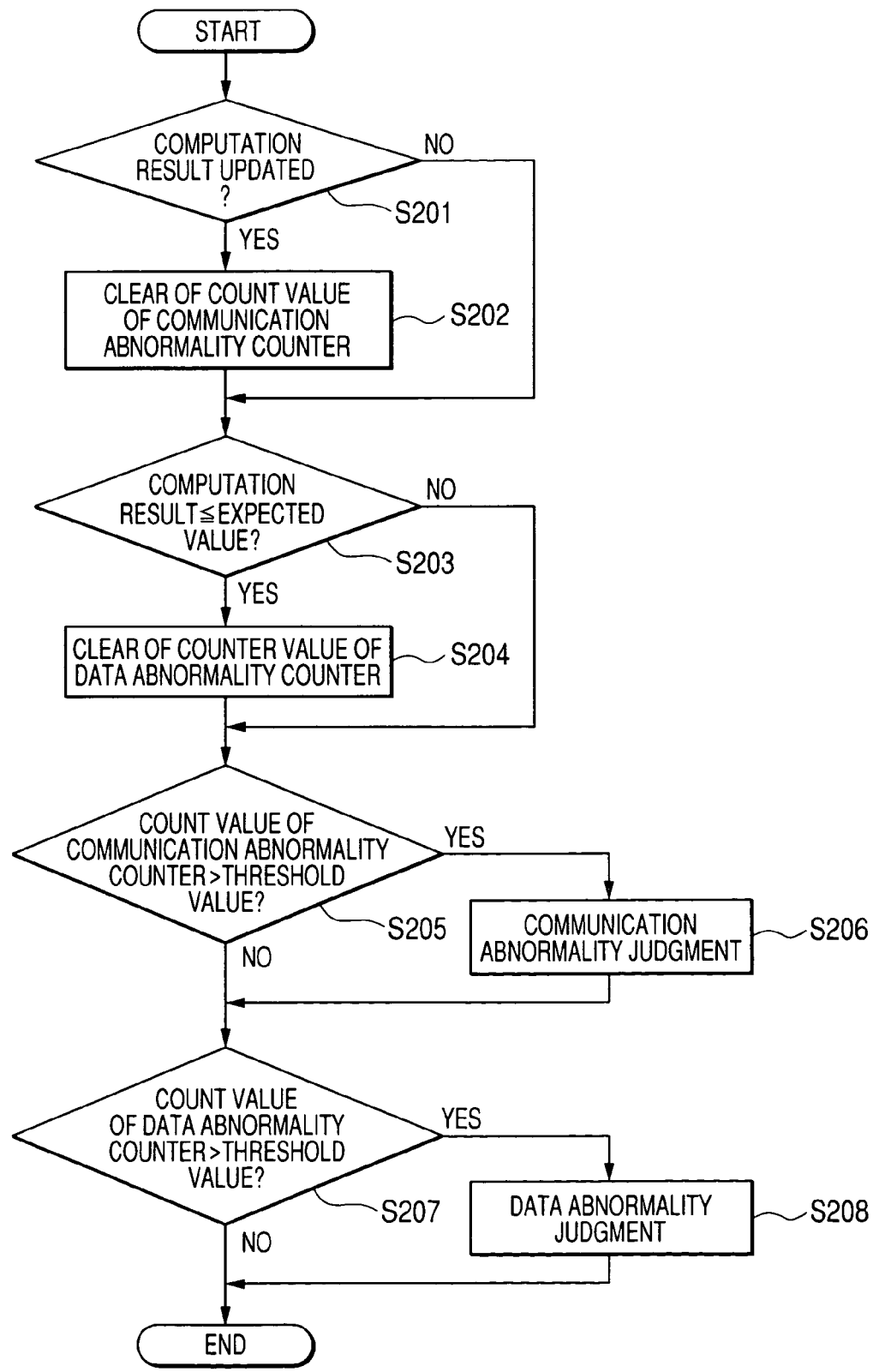
FIG. 15 is a flowchart showing an abnormality determining process for determining abnormality in the self-monitoring section performed by a digital circuit block included in the monitor module and configured to perform value comparison.

As shown in FIG. 15, the abnormality determining process begins by checking at step S201 whether or not the data (computation result and its expected value) stored in the two registers included in the digital circuit block 121e, which are equivalent to the registers 151, 152, has been updated. If the check result is affirmative, the count value of a counter equivalent to the communication abnormality counter 157 is cleared at step S202, and then the process moves to step S203. If the check result at step S201 is negative, the process moves to step S203 without performing step S202, that is, without clearing the count value of the counter equivalent to the communication abnormality counter 157.

At step S203, a value comparison between the computation result and its expected value respectively stored in the two registers equivalent to the registers 151, 152 is performed by a comparator equivalent to the first comparator 153. If it is determined that the computation result (the duty ratio) does not exceed its expected value (the maximum allowable duty ratio "x %"), the count value of a counter equivalent to the data abnormality counter 154 is cleared at step S204, and then the process moves to step S205. On the other hand, if it is determined at step S203 that the computation result exceeds its expected value, the process moves to step S205 without performing step S204, that is, without clearing the count value of the counter equivalent to the data abnormality counter 154.

After the two counters equivalent to the communication abnormality counter 157 and the data abnormality counter 154 have been adjusted in this way, propernesses of their count values are checked at step S205 and step S207 in succession. Incidentally, it should be noted that also these two counters are configured to count up the clock generated by the clock generator 125.

More specifically, at step S205, a value comparison between the count value of the counter equivalent to the communication abnormality counter 157 and the threshold value stored in a memory equivalent to the memory 158 is performed. If it is determined at step S205 that the count value of the counter equivalent to the communication abnormality counter 157 exceeds the threshold value, since it means that a state over which the computation result and its expected value are not received has lasted for more than the predetermined threshold time, it is judged at step S206 that there is abnormality in the communication operation.

At step S207, a value comparison between the count value of the counter equivalent to the data abnormality counter 154 and the threshold value stored in a memory equivalent to the memory 155 is performed. If it is determined at step S207 that the count value of the counter equivalent to the data abnormality counter 154 exceeds the threshold value, since it means that a state in which the computation result exceeds its expected value has lasted for more than the predetermined threshold time, it is judged at step S208 that there is abnormality in the self-monitoring section 113.

The outputs of the second comparator 156 and the comparators equivalent to the second comparator 156 and the outputs of the third comparator 159 and the comparators equivalent to the third comparator 159 included in the digital circuit blocks 121a to 121e are supplied to an OR circuit 124 included in the monitor module 120, as monitoring results by the abnormality determining circuit 121. When any one of the digital circuit blocks 121a to 121e determines that there is abnormality in the communication operation, or in the judging function of the self-monitoring section 113, the OR circuit 124 outputs a signal indicative of such determination to the drive circuit 130. Such monitoring result supplied to the drive circuit 130 enables the drive circuit 130 to open and close the throttle valve through the motor M at higher accuracy.

The monitor module 120 has a reference counter 126 whose count value is taken in by the module monitoring section 115 through the communication 122 and the communication 114, so that it is monitored by the module monitoring section 115.

The reference counter 126 is configured to count up the clock generated by the clock generator 126 like the data abnormality counter 154, the communication abnormality counter 157, and other equivalent counters of the digital circuit blocks 121a to 121e. This configuration in which the count values of the data abnormality counter 154, communication abnormality counter 157, and other equivalent counters included in the digital circuit blocks are indirectly monitored by the module monitoring section 115 on the basis of the count value of the reference counter 126 makes it possible to judge whether or not the monitor module 120 itself is in an inoperable state in which it cannot perform the monitoring operation. When the module monitoring section 115 judges that the monitor module 120 itself is in such an inoperable state, the module monitoring section 115 outputs a signal of such judgment to the drive circuit 130. Such monitoring result supplied to the drive circuit 130 from the module monitoring section 115 enables the drive circuit 130 to open and close the throttle valve through the motor M at higher reliability.

As shown in FIG. 1, the module monitoring section 115 is configured to take in also the output of OR circuit 124 of the monitor module 120. When the output of the OR circuit 124 of the monitor module 120 indicates that there is abnormality in the self-monitoring section 113 or in the communication operation, the module monitoring section 115 stores such indication, and performs a process for maintaining the output state of the drive circuit 130 in good order.

Figure 16:
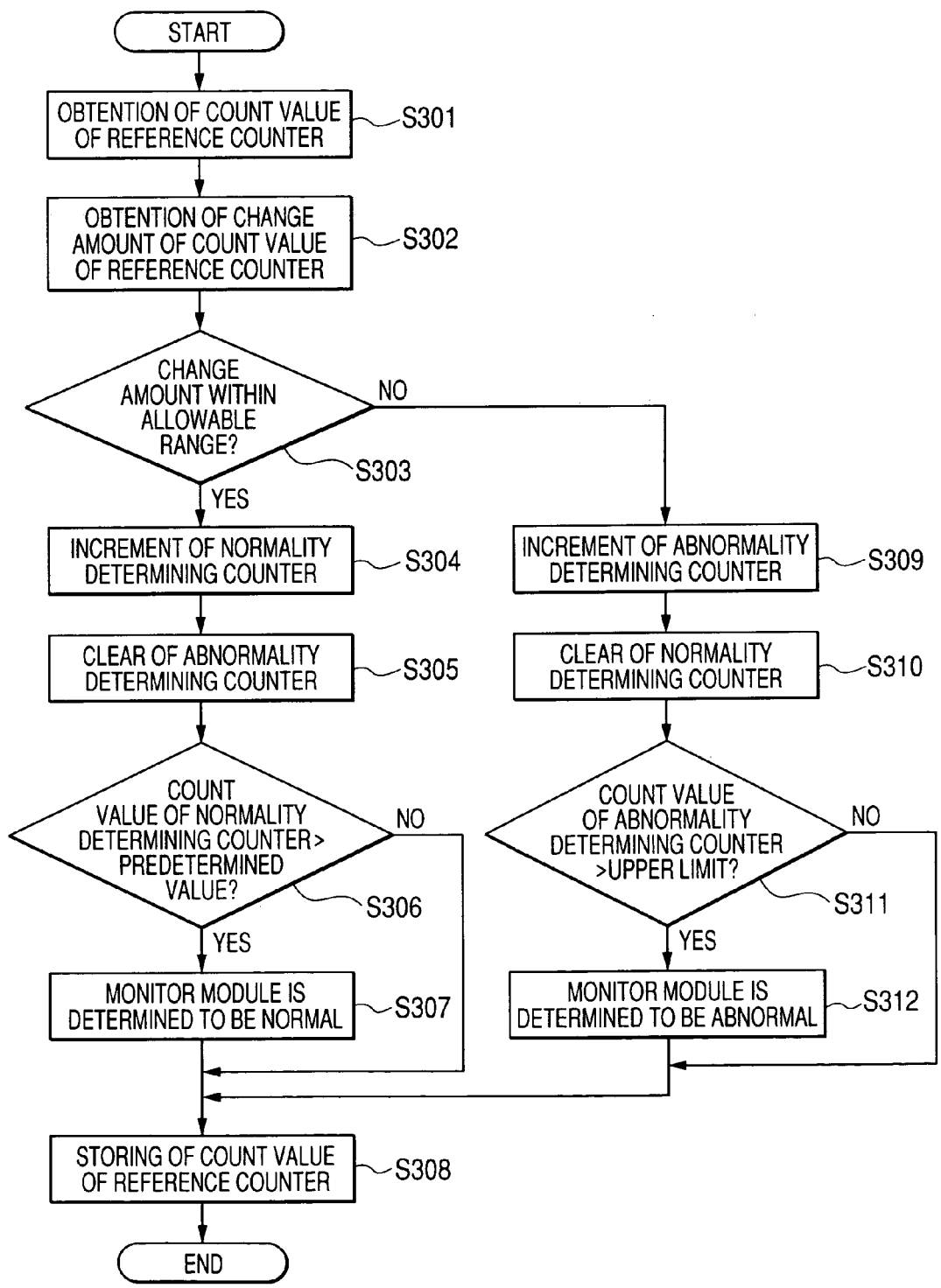
FIG. 16 is a flowchart showing an abnormality determining process for determining abnormality in the monitor module performed by a module monitoring section included in the microcomputer.

Next, an abnormality determining process performed by the module monitoring section 115 for determining abnormality in the monitor module 120 is explained together with the structure of the module monitoring section 115 with reference to the flowchart shown in FIG. 16. This abnormality determining process is performed repeatedly at regular time intervals.

As shown in FIG. 16, this abnormality determining process begins by taking in the count value of the reference counter 126 through the communication section 122 of the monitor module 120 and the communication section 114 at step S301. At subsequent step S302, a change amount of this count value is calculated on the basis of this count value and the count value which was taken in at a previous time and stored in a certain memory. After that, it is checked at step S303 whether or not the calculated change amount is within a predetermined allowable range.

If the check result at step S303 is affirmative, the process moves to step S304 where a count value of a normality determining counter (not shown) included in the microcomputer 110 is incremented. Subsequently, a count value of an abnormality determining counter (not shown) included in the microcomputer 110 is cleared at step S305. After the count values of the normality determining counter and the abnormality determining counter are adjusted in this way, it is checked at step S306 whether or not the count value of the normality determining counter exceeds a predetermined value. If the check result at step S306 is affirmative, a signal indicative of the monitor module 120 functioning normally is outputted to the monitor module 120 at step S307, and the count value of the reference counter 126 is stored in a certain memory at step S308 to complete this abnormality determining process.

On the other hand, if the check result at step S306 is negative, that is, if the count value of the normality determining counter does not exceed the predetermined value, the count value of the reference counter 126 at this moment is stored in the certain memory at step S308, while maintaining the output to the drive circuit 130 to complete this abnormality determining process.

If the check result at step S303 is negative, that is, if it is determined that the calculated change amount is outside the allowable range, the process moves to step S309 where the count value of the abnormality determining counter included in the microcomputer 110 is incremented. Subsequently, the count value of the normality determining counter included in the microcomputer 110 is cleared at step S310. After the count values of the normality determining counter and the abnormality determining counter are adjusted in this way, it is checked at step S311 whether or not the count value of the abnormality determining counter exceeds a predetermined upper limit. If the check result at step S311 is affirmative, a signal indicative of abnormality being in the monitor module 120 is outputted to the monitor module 120 at step S312, and the count value of the reference counter 126 at this moment is stored in the certain memory at step S308 to complete this abnormality determining process.

On the other hand, if the check result at step S311 is negative, that is, if the count value of the abnormality determining counter does not exceed the upper limit, the count value of the reference counter 126 at this moment is stored in the certain memory at step S308, while maintaining the output to the drive circuit 130 to complete this abnormality determining process.

The drive circuit 130 of the electronic control apparatus 100 is a section for driving the actuator (motor) to open and close the throttle valve in accordance with the drive command received from the control section 112 under normal condition, although it receives other various signals from the control section 112, the self-monitoring section 113, the module monitoring section 115, and the abnormality determining circuit 121. However, when the self-monitoring section 113 outputs a signal indicating that the drive command outputted from the control section 112 is not valid, the reliability of the throttle valve control in accordance with the drive command supplied to the drive circuit 130 cannot be assured. Likewise, when the abnormality determining circuit 121 outputs a signal indicative of abnormality being in the self-monitoring section 113, or when the module monitoring section 115 outputs a signal indicating that the monitor module 120 itself is in the inoperable state in which it cannot perform the monitoring operation, the reliability of the throttle valve control in accordance with the drive command supplied to the drive circuit 130 cannot be assured. Accordingly, when any of such signals is outputted to the drive circuit 130, the drive circuit 130 performs a fail-safe process, while negating the drive command outputted from the control section 112 to ensure vehicle safety. More specifically, the drive circuit 130 interrupts power supply to the actuator (motor) of throttle valve from the vehicle battery in order to keep the throttle valve in a fail-safe state.

Next, the fail-safe process for the throttle valve performed by the electronic control apparatus 100 is explained with reference to time charts shown in FIG. 17 and FIG. 18. Here, it is assumed that the module monitoring section 115 outputs a signal indicating that the monitor module 120 itself is in the inoperable state in which it cannot perform the monitoring operation.

During a period in which the controlled variable (drive amount) by which the throttle valve is controlled is computed, the self-monitoring section 113 performs the ROM check, RAM check, instruction check, flow check, and system check at predetermined computation cycles. Each time the self-monitoring section 113 completes monitoring of any of the five monitoring items, a check completion flag is set in a certain memory for each of the five monitoring items separately (see (a) to (e) in FIG. 17). As seen from FIG. 17, the computation cycle of the ROM check (see (e) in FIG. 17) is later than the computation cycles of the other monitoring items (see (a) to (d) in FIG. 17).

The communication section 114 transmits transmission data as shown in FIG. 12 to the monitor module 120 in accordance with each check completion flag set in a way described above (see (f) to (j) in FIG. 17). This transmission process uses a time sharing method for enabling transmitting the transmission data while other data is being transmitted.

The transmission data as shown in FIG. 12 transmitted in this way is supplied to corresponding one of the digital circuit blocks, which is associated with the identifier added to the transmission data. The transmission data serves to clear the count value of the two counters equivalent to the data abnormality counter 154 and the communication abnormality counter 157 of the digital circuit block supplied with the transmission data (see (a) to (j) in FIG. 18).

Figure 17:
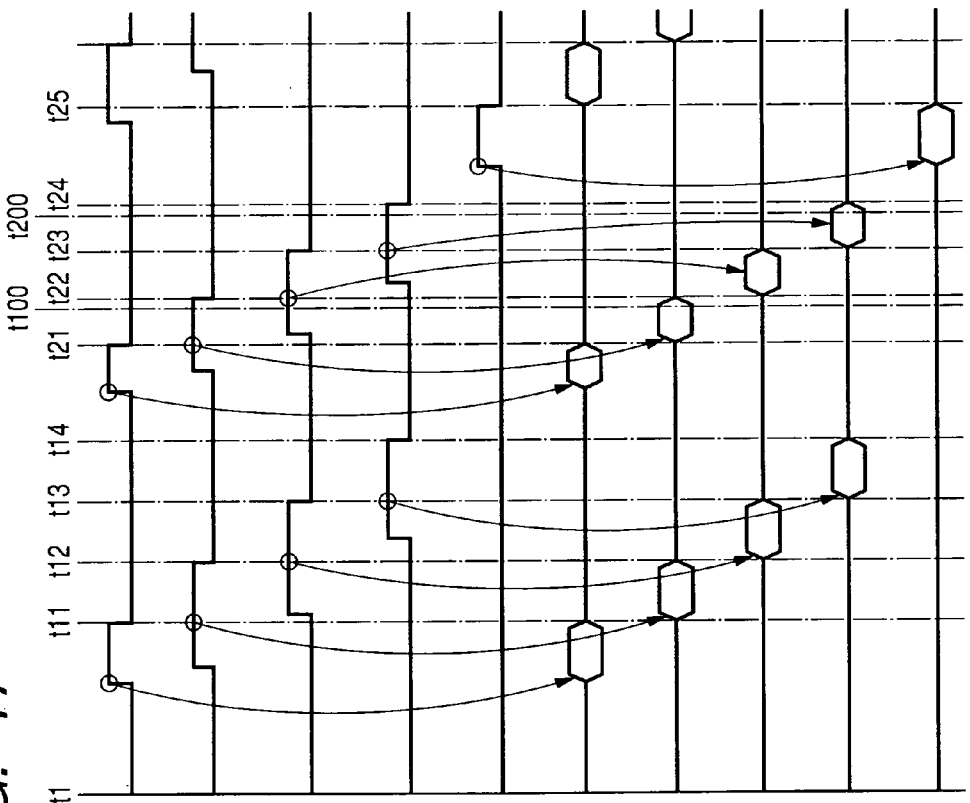
FIG. 17 is a timing chart for explaining progress of a fail-safe process for a throttle valve performed by the electronic control apparatus.

For example, the transmission data having been used for the RAM check, which is transmitted at timing t11 and timing t21 (see (f) in FIG. 17), is supplied to the digital circuit block 121b. As a result, in the digital circuit block 121b, the count value of the counter equivalent to the data abnormality counter 154 and the count value of the counter equivalent to the communication abnormality counter 157 are cleared at timing t11 and timing t21 (see (a), (f) in FIG. 18).

The transmission data having been used for the instruction check, which is transmitted at timing t12 and timing t22 (see (g) in FIG. 17), is supplied to the digital circuit block 121c. As a result, in the digital circuit block 121c, the count value of the counter equivalent to the data abnormality counter 154 and the count value of the counter equivalent to the communication abnormality counter 157 are cleared at timing t12 and timing t22 (see (b), (g) in FIG. 18).

The transmission data having been used for the flow check, which is transmitted at timing t13 and timing t23 (see (h) in FIG. 17), is supplied to the digital circuit block 121d. As a result, in the digital circuit block 121d, the count value of the counter equivalent to the data abnormality counter 154 and the count value of the counter equivalent to the communication abnormality counter 157 are cleared at timing t13 and timing t23 (see (c), (h) in FIG. 18).

The transmission data having been used for the system check, which is transmitted at timing t14 and timing t24 (see (i) in FIG. 17), is supplied to the digital circuit block 121e. As a result, in the digital circuit block 121e, the count value of the counter equivalent to the data abnormality counter 154 and the count value of the counter equivalent to the communication abnormality counter 157 are cleared at timing t14 and timing t24 (see (d), (i) in FIG. 18).

The transmission data having been used for the ROM check, which is transmitted at timing t25 (see (j) in FIG. 17), is supplied to the digital circuit block 121a. As a result, in the digital circuit block 121a, the count value of the counter equivalent to the data abnormality counter 154 and the count value of the counter equivalent to the communication abnormality counter 157 are cleared at timing t25 (see (e), (j) in FIG. 18).

Figure 18:
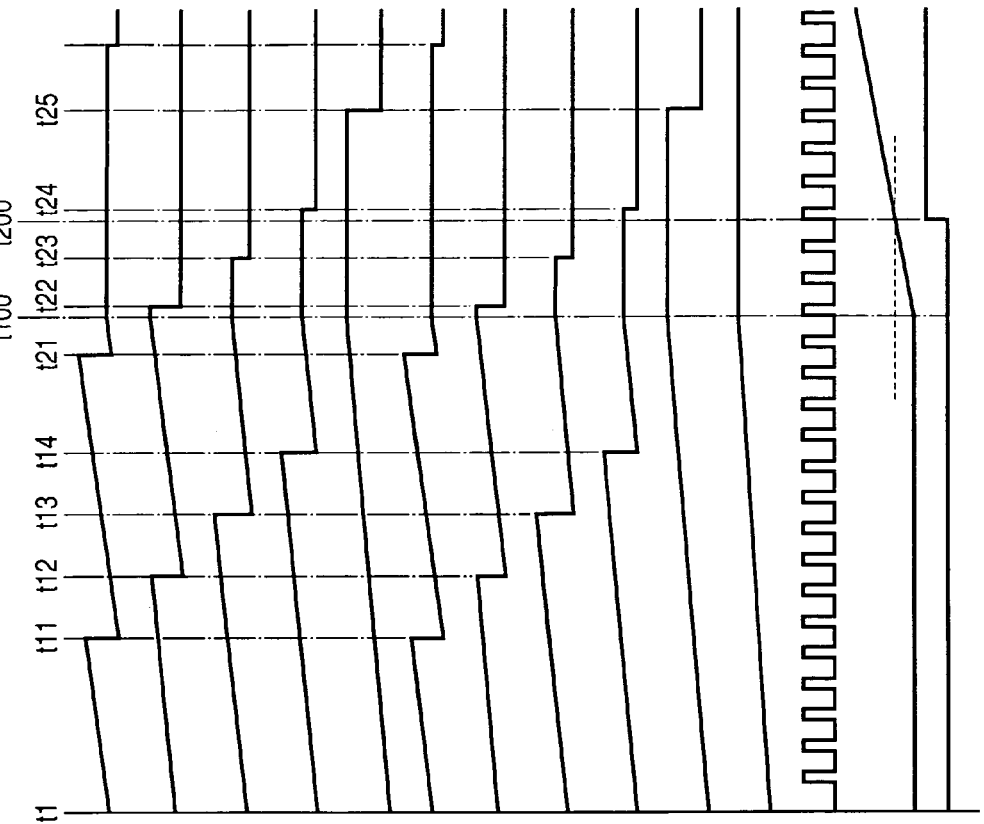
FIG. 18 is a timing chart for explaining progress of a fail-safe process for the throttle valve performed by the electronic control apparatus.

As explained above, the module monitoring section 115 judges, by monitoring the count value of the reference counter 126 configured to count up the clock generated by the clock generator 125 (see (k) in FIG. 18), whether or not the monitor module 120 itself is in the inoperable state in which it cannot perform the monitoring operation on the basis of the count values of the counters included in the digital circuit blocks, which are configured to count up the clock generated by the clock generator 125 and to be reset (cleared) at some timings.

More specifically, the module monitoring section 115 takes in the count value of the reference counter 126 at regular time intervals to monitor a change amount between the current count value and the count value which was taken in at a previous time (see (l), (m) in FIG. 18). At timing t100 when the change amount goes outside a predetermined allowable range or later, the count value of the abnormality determining counter included in the microcomputer 110 is continuingly incremented, since the count values of the data abnormality counter 154, communication abnormality counter 157, and other equivalent counters included in the digital circuit blocks 121a to 121e are not reliable at timing t100 or later. In consequence, when the count value of the abnormality determining counter exceeds an upper limit value at timing t200, the module monitoring section 115 judges that the monitor module 120 itself is in the inoperable state in which it cannot perform the monitoring operation, and outputs a signal indicative of such judgment to the drive circuit 130. The drive circuit 130 interrupts, in response to this signal, power supply from the vehicle battery to the throttle valve side in order to maintain the throttle valve in a fail-safe state.

As explained above, the electronic control apparatus 100 according to this embodiment offers many advantages as set forth below.

(1) The module monitoring section 115 monitors the count value of the reference counter 126. This makes it possible to indirectly monitor the data abnormality counter 154, communication abnormality counter 157, and other equivalent counters included in the digital circuit blocks 121a to 121e of the monitor module 120 in order to make a judgment as to whether or not the monitor module 120 itself is in the inoperable state in which it cannot perform the monitoring operation.

(2) The module monitoring section 115 takes in the count value of the reference counter 126 at regular time intervals, and makes a judgment that the monitor module 120 is not functioning properly when a state in which the current count value is not different from a count value taken in at a previous time has lasted for more than the predetermined time. This makes it possible to monitor module 120 at higher reliability.

(3) The microcomputer 110 transmits, while monitoring the control section 112 by use of the self-monitoring section 113 thereof, a computation result depending on the content of a monitoring object together with its expected value to which the computation result is expected to be equal. The monitor module 120 monitors whether or not the self-monitoring section 113 is functioning properly on the basis of the comparison between the computation result and its expected value transmitted from the microcomputer 110. This makes it possible to keep the microcomputer 110 in a state in which the self-monitoring section 113 is well monitored through the monitor module 120, to thereby improve the reliability of the drive control of a vehicle actuator (throttle valve).

(4) The monitor module 120 judges that the self-monitoring section 113 is not functioning properly when the computation result and its expected value transmitted from the microcomputer 110 are not matched with each other. This makes it possible to monitor the self-monitoring section 113 properly (5) The monitor module 120 judges that the communication operation between the monitor module 120 and the microcomputer 110 is not functioning properly, when a state over which the computation result and its expected value are not received has lasted for more than a predetermined time. This makes it possible to monitor the self-monitoring section 113 more properly.

(6) The monitor module 120 has a plurality of the digital circuit blocks 121a to 121e corresponding to the five monitoring items (ROM check, RAM check, instruction check, flow check and system check) to be monitored by the self-monitoring section 113. The data containing the computation result and its expected value transmitted from the microcomputer 110 is supplied to one of the digital circuit blocks 121a to 121e, which is associated with the identifier added to this data, to be compared with each other. This makes it possible to check the operation of the self-monitoring section 113 for each of the five monitoring items.

Second Embodiment

Next, a second of the invention is described. An electronic control apparatus according to the second embodiment, which is an apparatus for controlling an actuator (motor) for driving a throttle valve, is constituted mainly by a microcomputer, a monitor module, and a drive circuit as in the case of the electronic control apparatus according to the first embodiment shown in FIG. 1.

Like the first embodiment, the monitor module of this embodiment includes a reference counter counting up a clock serving as operation reference of digital circuit blocks thereof, and the microcomputer of this embodiment includes a module monitoring section configured to take in the count value of the reference counter to monitor whether or not the monitor module is functioning properly.

Figure 19:
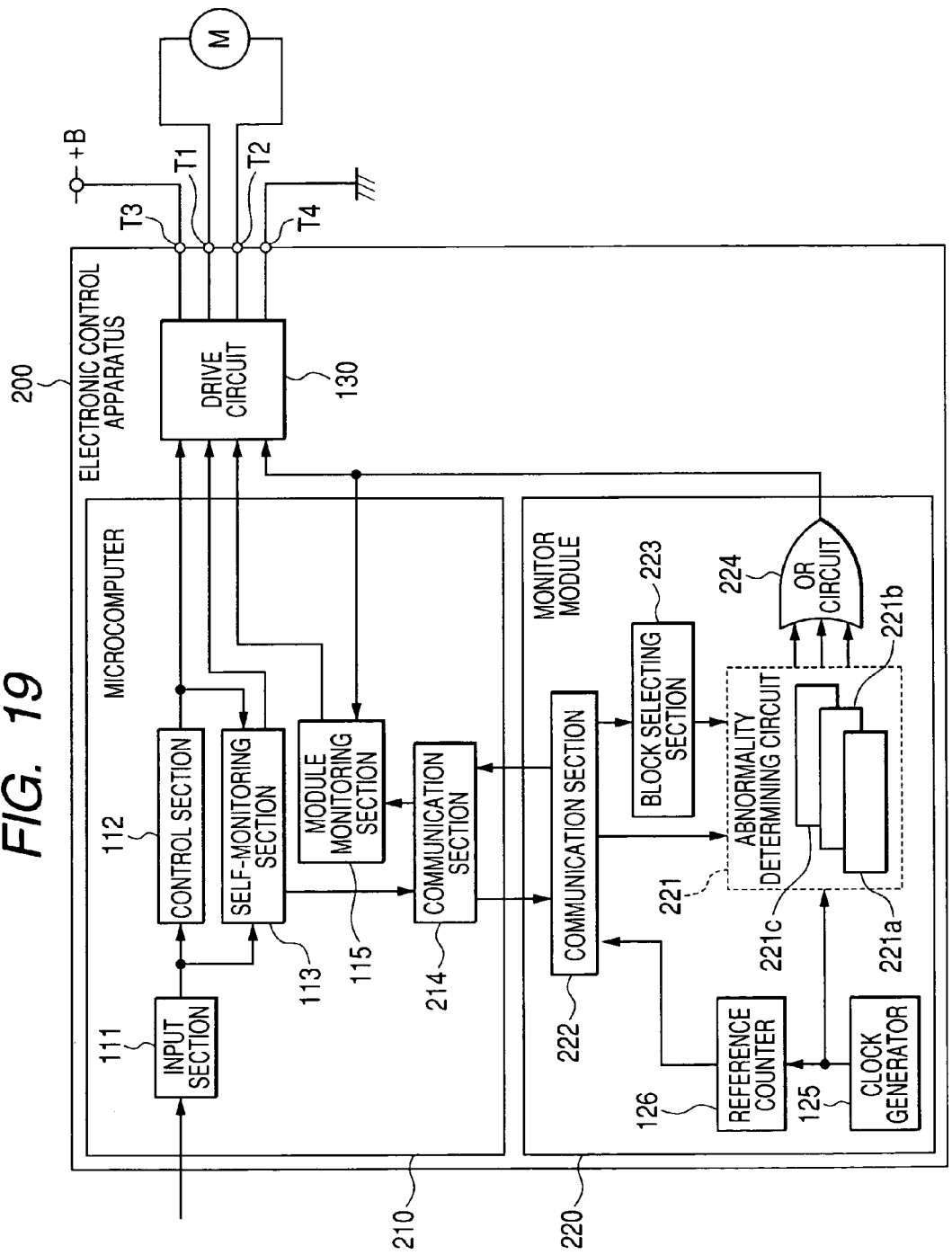
FIG. 19 is a block diagram showing an overall structure of an electronic control apparatus according to a second embodiment of the invention.

However, in the second embodiment, as shown in FIG. 19, the communication section 214 of the microcomputer 210 is configured to classify the five monitoring items into three monitoring groups, and to transmit a computation result ant its expected value for each of the three monitoring groups separately. And the monitor module 220 is provided with three digital circuit blocks 221a to 221c constituting the abnormality determining circuit 221 to monitor abnormality in the self-monitoring section 113 for each of the three monitoring groups. In the second embodiment having such a configuration, comparison between a computation result and its expected value is performed by the same one of the digital circuit blocks 221a to 221c for the monitoring items of the same monitoring group. This makes it possible to reduce the circuit scale of the monitor module 220 having many monitoring functions even when it is implemented as a custom IC. This also makes it possible to reduce the manufacturing cost of the monitor module 220.

Of the five monitoring items, the ROM check, RAM check, instruction check, and flow check are preformed through match comparison. The rest of the monitoring items, that is, the system check is performed through value comparison. Of the four monitoring items to be monitored through match comparison, the computation cycle of each of the RAM check, instruction check, and flow check is relatively short, while that of the ROM check is relatively long. Hence, the communication section 214 classifies the five monitoring items into a group consisting of the RAM check, instruction check, and flow check, a group consisting of the ROM check, and a group consisting of the system check.

The digital circuit block 221a as a high speed digital circuit block of the monitor module 220 is configured to perform match comparison between a computation result and its expected value at a relatively short computation cycle. The digital circuit block 221b of the monitor module 220 is configured to perform match comparison between a computation result and its expected value at a relatively long computation cycle. The digital circuit block 221c of the monitor module 220 is configured to perform value comparison between a computation result and its expected value. The structures of the digital circuit blocks 221a and 221b are substantially the same as the structure of the digital circuit block 121a shown in FIG. 13. The structure of the digital circuit block 221c is substantially the same as the structure of the digital circuit block 121e.

In this embodiment, for the monitoring items needing the relatively short monitoring cycle (the RAM check, instruction check, and the flow check), the block selecting section 223 supplies a computation result and its expected value to the same digital circuit block 221a to perform match comparison therebetween. Accordingly, the circuit scale of the monitor module 220 can be reduced.

On the other hand, for the monitoring item needing the relatively long monitoring cycle (the ROM check), the block selecting section 223 supplies a computation result and its expected value to the digital circuit block 221b as a low speed digital circuit block to perform match comparison therebetween. This makes it possible to prevent that the monitoring of the monitoring items needing the relatively short computation cycle are delayed to perform the monitoring of the monitoring item needing the relatively long computation cycle, to thereby enable early detection of abnormality in the self-monitoring section 113.

For the monitoring item to be monitored through value comparison (the system check), the block selecting section 223 supplies a computation result and its expected value to the digital circuit block 221c to perform value comparison therebetween.

In this embodiment, the computation results having been used to perform the RAM check, the instruction check, and the flow check, respectively, which need match comparison and the relatively short computation cycle, are summed up. The summation of these computation results and its expected value stored in a memory or the like, to which the summation is expected to be equal, are transmitted to the communication section 222 of the monitor module 220. The block selecting section 223 supplies the summation and its expected value to the digital circuit block 221a where match comparison therebetween is performed. In this way, the monitorings of three of the five monitoring items are performed at once.

Figure 20:
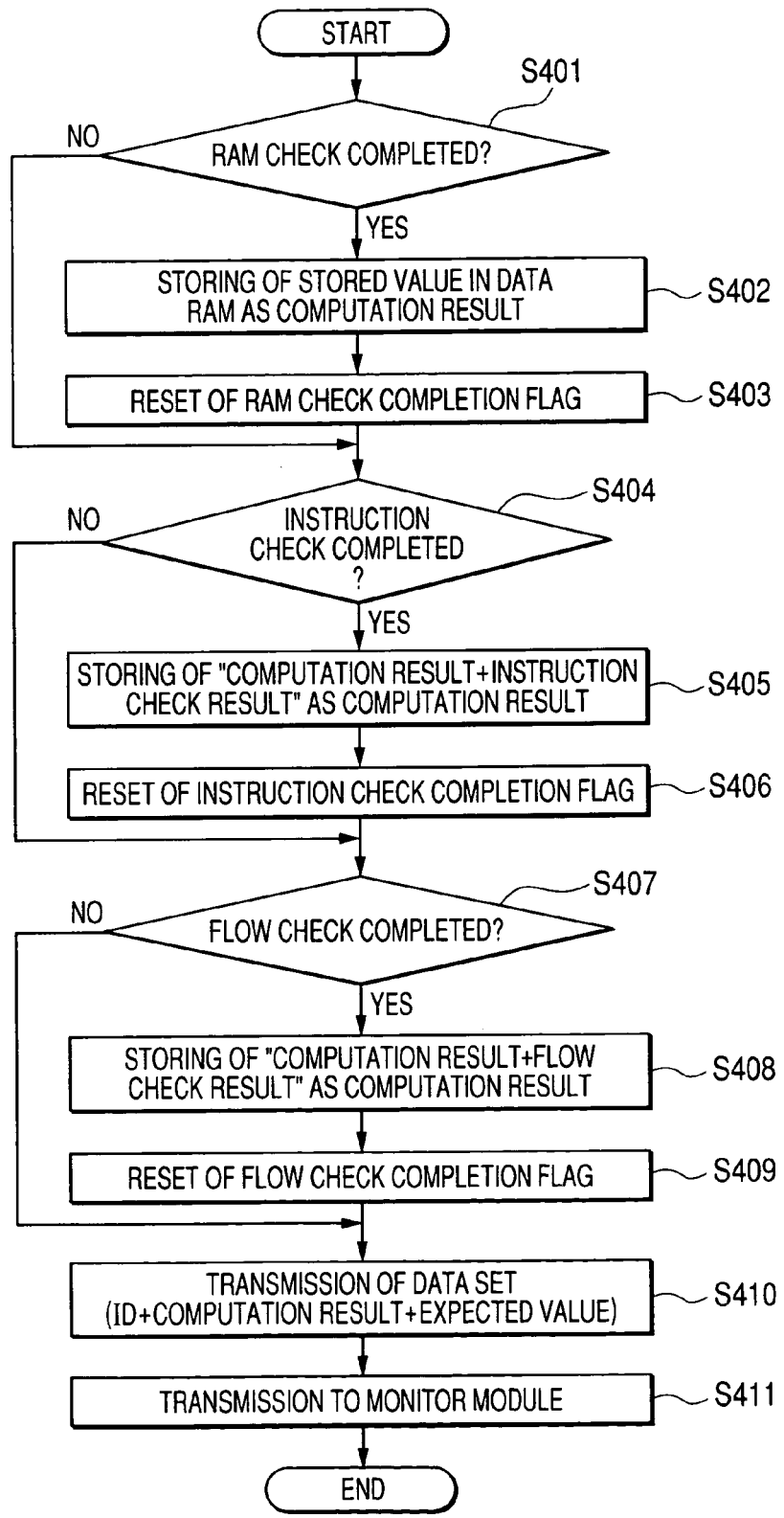
FIG. 20 is a flowchart showing a transmission process for transmitting summation of computation results and its expected values at the time of performing the RAM check, instruction check, and flow check.

FIG. 20 is a flowchart showing a process of transmitting the summation of the computation results having been used for performing the RAM check, the instruction check and the flow check, and its expected value. This transmission process is performed repeatedly at regular time intervals.

As shown in FIG. 20, to start this transmission process, the communication section 214 checks at step S401 whether or not the RAM check completion flag has been set by the self-monitoring section 113. If the check result is affirmative, the process moves to step S402.

At step S402, the computation result (the stored value in the data RAM) is read from the certain memory, with which a register (not shown) included in the microcomputer 210 is loaded. Subsequently, the RAM check completion flag is reset (cleared) at step S403.

Next, it is checked at step S404 whether or not the instruction check completion flag has been set by the self-monitoring section 113. If the check result at step S404 is affirmative, the process moves to step S405 where the computation result (the computed value of the simulating data) as shown in FIG. 4 is read from a certain memory. Subsequently, the content of the register is updated by adding this computation result to the computation result stored in this register. After that, the instruction check completion flag is reset (cleared) at step S406.

Next, it is checked at step S407 whether or not the flow check completion flag has been set by the self-monitoring section 113. If the check result at step S407 is affirmative, the process moves to step S408 where the computation result (the count value) as shown in FIG. 5 is read from a certain memory. Subsequently, the content of the register is updated by adding this computation result read from the certain memory to the computation result stored in this register. After that, the flow check completion flag is reset (cleared) at step S409.

After completion of steps S401 to S409, the process moves to step S410 where transmission data as shown in FIG. 12 is produced by adding the summation of the three computation results stored in the register with its expected value stored in a certain memory, to which the summation is expected to be equal. This transmission data is added with its identifier (ID). The transmission data thus produced is transmitted to the communication section 222 of the monitor module 220 through serial communication or parallel communication.

It should be noted that if it is determined at any one of steps S401, S404, and S407 that the expected check completion flag has not been set, it results that transmission data containing the summation which does not match its expected value is produced at step S410. At step S411, the transmission data is transmitted to the communication section 222 of the monitor module 220, as a result of which the monitor module 222 outputs a signal indicative of the reception of the transmission data to the drive circuit 130.

In such a transmission process, the monitor module 220 can collectively monitor whether the monitorings of the three monitoring items (RAM check, instruction check, and flow check) have been performed properly by the self-monitoring section 113. This makes it possible to reduce the computation load and the circuit scale of the monitor module 220.

Incidentally, the computation result (ROM sum value) and its expected value ("5AA5", for example) as shown in FIG. 2 having been used for performing the ROM check are transmitted by a process similar to the process shown in FIG. 7. And computation result (duty ratio) and its expected value (maximum allowable value "x %") as shown in FIG. 6 having been used for performing the system check are transmitted by a process similar to the process shown in FIG. 11.

As explained above, the second embodiment offers, in addition to the advantages (1) to (5) described above, the following advantages.

(7) To monitor whether or not the monitorings of the monitoring items needing match comparison and the relatively short computation cycle have been performed properly, the monitor module 220 uses the digital circuit block 221a in common. This makes it possible to reduce the circuit scale and the manufacturing cost of the monitor module 220.

(8) As for the three monitoring items needing match comparison and the relatively short computation cycle, the communication section 214 of the microcomputer 210 calculates summation of the computation results having been used for monitoring these monitoring items. This summation and its expected value to which the summation is expected to be equal are transmitted to the communication section 222 of the monitor module 220. The monitor module 220 collectively monitors whether or not the monitorings of these monitoring items have been performed properly through match comparison between the summation and its expected value. This makes it possible to reduce the computation load and the circuit scale of the monitor module 220.

(9) The monitor module 220 is provided with the digital circuit block 221a to perform match comparison between a computation result and its expected value for the monitoring items needing match comparison and the relatively short computation cycle, the digital circuit block 221b to perform match comparison between a computation result and its expected value for the monitoring item needing match comparison and the relatively long computation cycle, and the digital circuit block 221c to perform value comparison between a computation result and its expected value for the monitoring item needing value comparison. This enables early detection of abnormality in the self-monitoring section 113.

It is a matter of course that various modifications can be made to the above described embodiments as described below.

The second embodiment may be so configured as to monitor whether the monitoring of the monitoring items needing match comparison and the relatively short computation cycle have been performed properly on an individual basis. In this case, the computation results and their expected values having been used for monitoring these three monitoring items can be transmitted to the monitor module 220 separately in a time-sharing manner.

The second embodiment may be so configured as to perform match comparison by use of a common digital circuit block for the four monitoring items needing match comparison. In this case, although there is a possibility that the monitoring of the monitoring item needing the relatively long computation cycle interferes with the monitorings of the monitoring items needing the relatively short computation cycle, the circuit scale of the monitor module can be reduced.

Although the number of the monitoring items monitored by the self-monitoring section 113 is 5 in the above described embodiments, the contents and the number of the monitoring items can be set as necessary. For example, the self-monitoring section 113 may be so configured as to perform monitorings of only the monitoring items which needs match comparison. Even in this case, early detection of abnormality is possible by providing the monitor module with a digital circuit block for each group of monitoring items needing about the same period of the computation cycle.

The monitor module may be so configured as to judge that the communication operation between the microcomputer and the monitor module is not functioning properly, when a state in which a computation result and its expected value are not received has lasted for more than a predetermine time.

The monitor module may be so configured as to judge that the monitoring function of the microcomputer is not functioning properly, when it is detected that a computation result and its expected value does not match through match comparison therebetween.

Figure 21:
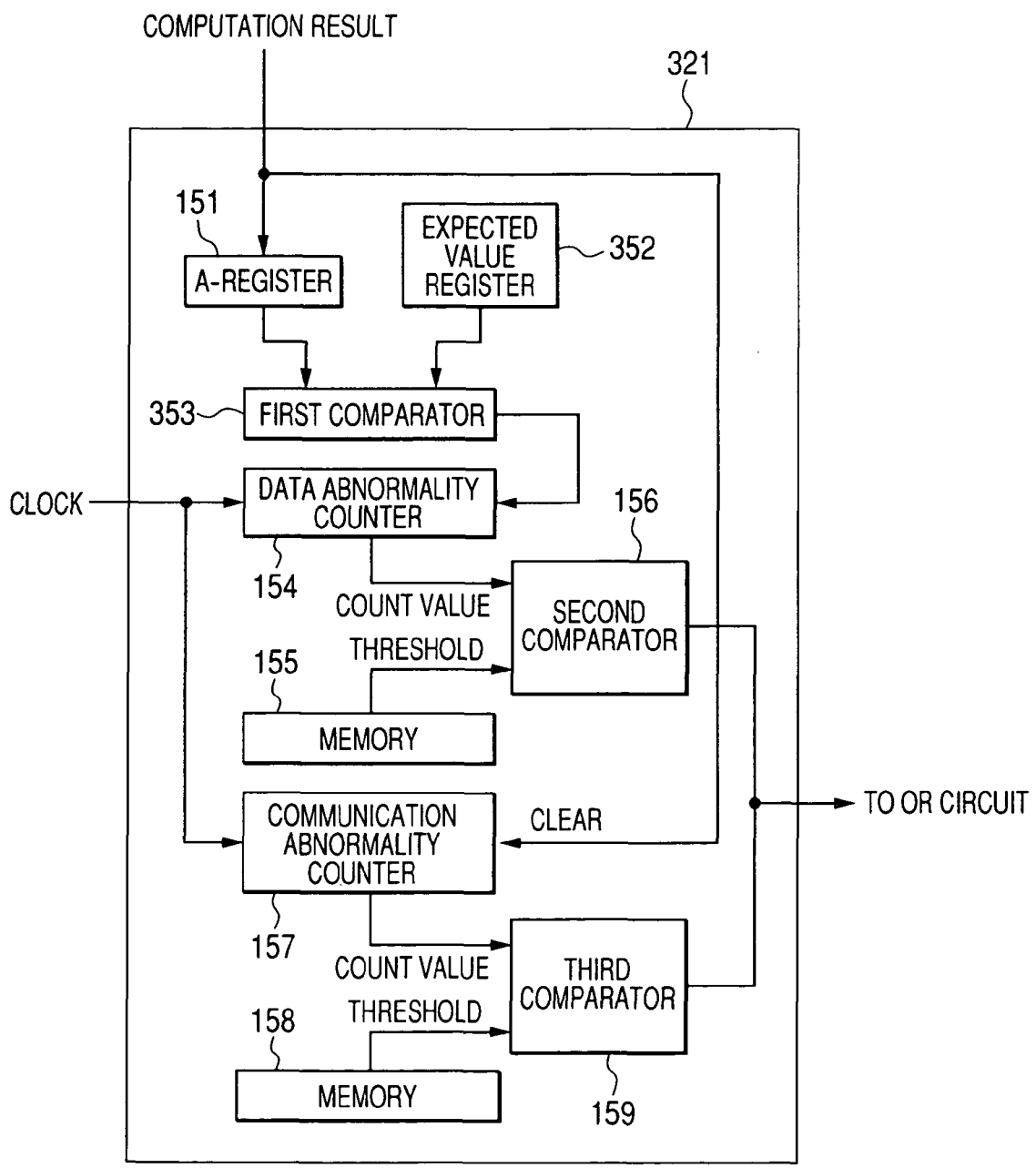
FIG. 21 is a diagram showing a structure of a variant of the digital circuit block.
Figure 22:
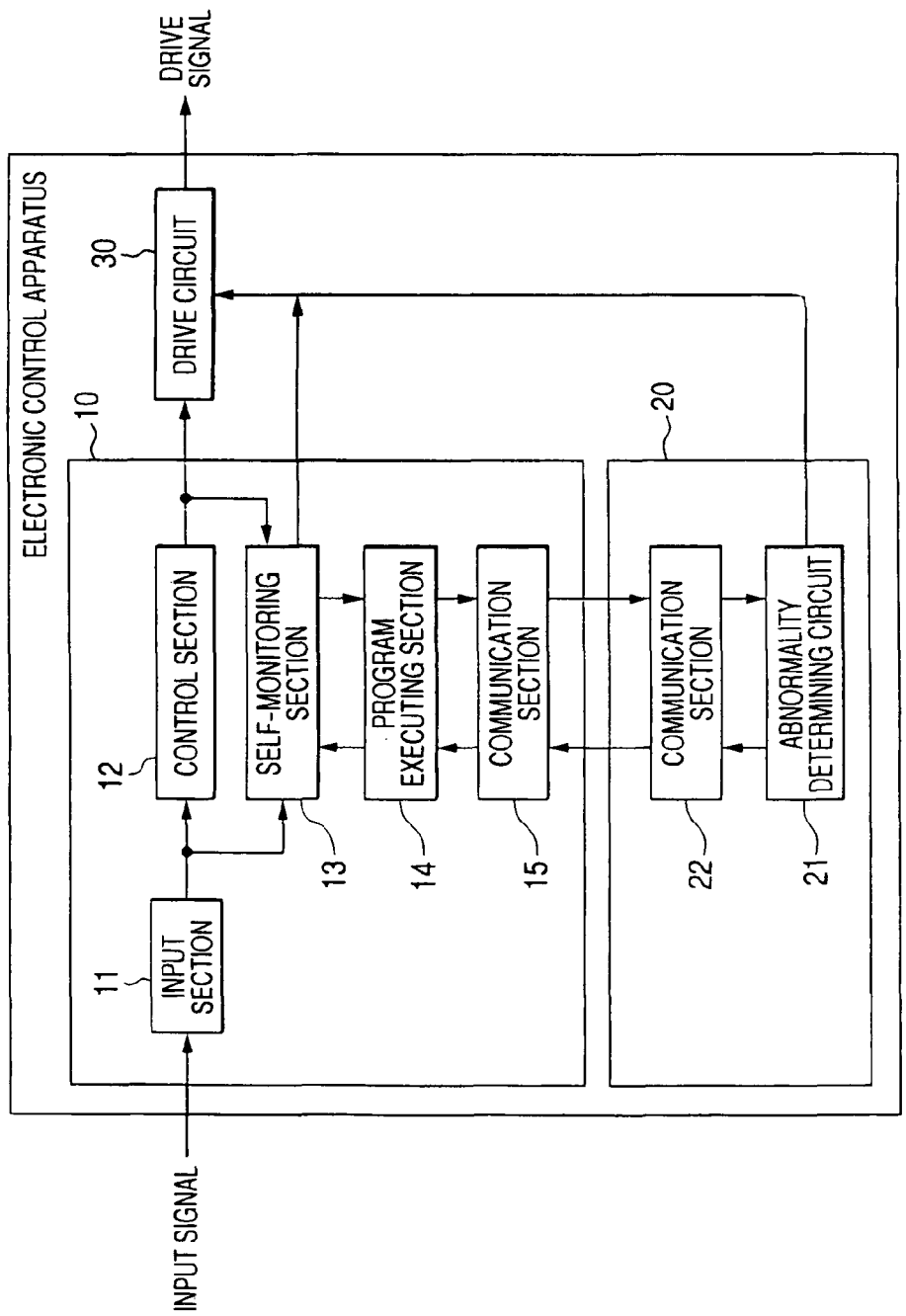
FIG. 22 is a block diagram showing an overall structure of a conventional electronic control apparatus.

The microcomputer may be so configured as to transmit only a computation result depending on the content of a monitoring object, while monitoring the control section 112 by use of the self-monitoring section 113, if the monitor module is provided with means for storing an expected value to which the computation result is expected to be equal. In this case, as shown in FIG. 21, the digital circuit block 321 is provided with an expected-value register 352 in place of the B-register 152 shown in FIG. 13, in which the expected value is stored as a fixed value. And the comparison between the computation result stored in the A-register 151 and the expected value stored in the expected-value register 352 is performed by the first comparator 353 of the digital circuit block 321. Even in this case, it is possible to monitor whether the self-monitoring section 113 monitoring the control section 112 is functioning properly. In this case, however, as is true with the second embodiment, it might be preferable to adjust a computation result so as to be comparable to the prestored expected value depending on the content of a monitoring object, and to transmit the adjusted computation result to the monitor module.

The module monitoring section 115 may be so configured as to judge that the monitor module 120 is not functioning properly, when the current count value of the reference counter 126 is not different from that taken in at a previous time. Alternatively, the module monitoring section 115 may be so configured as to judge that the monitor module 120 is not functioning properly, when such a state that the current count value of the reference counter 126 is the same as the count value of the reference counter 126 taken in at a previous time has occurred in succession.

With the electronic control apparatus configured to take in the count value of the reference counter counting up the clock serving as operation reference of the digital circuit blocks included in the monitor module, and monitor whether or not the monitor module is functioning properly on the basis of the count value taken in, it becomes possible to further improve the reliability of the drive control of vehicle actuators. In this sense, the electronic control apparatus does not necessarily have to concurrently perform the monitoring of the control section by use of the self-monitoring section thereof, and the monitoring of this self-monitoring section by use of the monitor module.

The electronic control apparatus can be used for controlling any object within a vehicle, if a computation result changes depending on a state of an engine of the vehicle.

The above explained preferred embodiments are exemplary of the invention of the present application which is described solely by the claims appended below. It should be understood that modifications of the preferred embodiments may be made as would occur to one of skill in the art.

What is claimed is:

1. An electronic control apparatus comprising:
   a microcomputer control configured to control an actuator mounted on a vehicle in accordance with an input signal indicative of a vehicle running state, and to self-monitor whether or not said control is functioning properly based on said input signal;
   a monitor module separate from said microcomputer and communicably connected to said microcomputer and having a digital circuit configured to monitor whether or not said self-monitoring is functioning properly;
   said monitor module including a reference counter counting up a clock serving as an operation reference of said digital circuit; and
   said microcomputer including a module monitoring section configured to take in a count value of said reference counter at regular time intervals and to monitor whether or not said monitor module is functioning properly by judging that said monitoring module is not functioning properly when count values taken in at successive time intervals do not change during a predetermined time period.

2. The electronic control apparatus according to claim 1, wherein:
   said microcomputer is configured to transmit, while monitoring said control by use of said self-monitoring function, a data set produced by said self-monitoring function to said monitor module,
   said data set including a computation result depending on content of a monitoring object and an expected value to which said computation result is expected to be equal.

3. The electronic control apparatus according to claim 2, wherein:
   said monitor module is configured to judge that said self-monitoring function is not functioning properly when a disparity between said computation result and said expected value lasts for more than a predetermined time period.

4. The electronic control apparatus according to claim 2, wherein:

said digital circuit of said monitor module includes a comparator performing comparison between said computation result and said expected value, and a data abnormality counter configured to count up said clock and to be cleared when it is determined that said computation result and said expected value are matched through said comparison, and said monitor module is configured to judge that said self-monitoring function is not functioning properly when a count value of said data abnormality counter exceeds a predetermined value.

5. The electronic control apparatus according to claim 2, wherein:
said monitor module is configured to judge that communication between said microcomputer and said monitor module is not functioning properly when said data set is not received by said monitor module for more than a predetermined time period.

6. The electronic control apparatus according to claim 5, wherein:
said digital circuit of said monitor module includes a communication abnormality counter configured to count up said clock and to be cleared when said data set is received, and
said monitor module is configured to judge that communication between said microcomputer and said monitor module is not functioning properly when a count value of said communication abnormality counter exceeds a predetermined value.

7. The electronic control apparatus according to claim 1, wherein:
said self-monitoring function monitors a plurality of monitoring objects to ensure proper functioning of said control, and
said microcomputer is configured to transmit data sets produced by said self-monitoring function to said monitor module together with identifiers indicating to which of said monitoring objects each of said data sets is related, each of said data sets including a computation result depending on a content of one of said monitoring objects and an expected value to which said computation result is expected to be equal, and
said digital circuit of said monitor module includes a plurality of digital circuit blocks corresponding to said plurality of said monitoring objects, and a block selecting section, each of said digital circuit blocks having a comparator for performing comparison between said computation result and said expected value, said block selecting section being configured to select, on the basis of said identifiers, one of said plurality of said digital circuit blocks to which a corresponding one of said data sets should be supplied.

8. The electronic control apparatus according to claim 7, wherein:
said digital circuit of said monitor module includes a first digital circuit block having a comparator for performing comparison for a match between said computation result and said expected value, and a second digital circuit block having a comparator for performing a comparison of relative values between said computation result and said expected value.

9. The electronic control apparatus according to claim 1, wherein:
said self-monitoring function monitors a plurality of monitoring objects to ensure proper functioning of said control, and
said microcomputer is configured to transmit data sets produced by said self-monitoring function to said monitor module together with identifiers indicating whether a comparison for matched values or relative values is needed for each of said data sets, each of said data sets including a computation result depending on a content of one of said monitoring objects and an expected value to which said computation result is expected to be equal, and
said digital circuit of said monitor module includes a first digital circuit block having a comparator for comparing said computation result and said expected value for a match, and a second digital circuit block having a comparator for comparing relative values of said computation result and said expected value, said monitor module being configured to said monitoring objects the same of comparison by use of corresponding one of said first digital circuit block and said second digital circuit block in common.

10. The electronic control apparatus according to claim 9, wherein:
said microcomputer is configured to compute a summation of computation results depending on contents of said monitoring objects needing comparison for matched values, and to transmit, as a data set, said summation and an expected value to which said summation is expected to be equal to said monitor module,
said monitor module is configured to collectively monitor said monitoring objects using comparison for matched values by use of said first digital circuit block.

11. The electronic control apparatus according to claim 7, wherein:
said plurality of said monitoring objects to be monitored by said self-monitoring function includes at least two of:
properness of a control program stored in a ROM included in said microcomputer and executed by said control,
properness of data stored in a data RAM included in said microcomputer as a computation result produced by said control,
properness of a computed value of fixed simulating data produced by said control,
properness of call order of functions called by said control, and
properness of a computed value of said input signal produced by said control.

12. The electronic control apparatus according to claim 1, wherein:
said self-monitoring function is configured to monitor a plurality of monitoring objects to ensure proper functioning of said control, and
said microcomputer is configured to transmit data sets produced by said self-monitoring function to said monitor module together with identifiers indicating which of a relatively short computation cycle and a relatively long computation cycle is used by each of said data sets,
each of said data sets including a computation result depending on a content of one of said monitoring objects and an expected value to which said computation result is expected to be equal, and wherein said digital circuit of said monitor module includes a high speed digital circuit block having a comparator for performing comparison between said computation result and said expected value at said relatively short computation cycle, and a low speed digital circuit block having a comparator for performing comparison between said computation result and said expected value at said relatively long computation cycle, and said monitor module is configured to monitor said monitoring objects by sharing a common circuit for those monitoring objects having one of said relatively short computation cycle, and said relatively long computation cycle by common use of a corresponding one of said high speed digital circuit block and said low speed digital circuit block.

13. The electronic control apparatus according to claim 12, wherein:

said microcomputer is configured to compute a summation of computation results depending on contents of said monitoring objects needing said relatively short computation cycle, and to transmit to said monitor module, as a data set, said summation and an expected value to which said summation is expected to be equal, and said monitor module is configured to collectively monitor said monitoring objects using said relatively short computation cycle through comparison for a match by use of said high speed digital circuit block.

14. The electronic control apparatus according to claim 12, wherein:

said plurality of said monitoring objects to be monitored by said self-monitoring function includes at least two of:

properness of a control program stored in a ROM included in said microcomputer and executed by said control, properness of data stored in a data RAM included in said microcomputer as a computation result produced by said control, properness of a computed value of fixed simulating data produced by said control, properness of call order of functions called by said control, and properness of a computed value of said input signal produced by said control.

15. The electronic control apparatus according to claim 1, wherein:

said actuator is an electric motor for opening and closing a throttle valve, and said electronic control apparatus further comprises:

a drive circuit driving said motor on the basis of a drive command outputted from said control section, and means for interrupting a power supply to said electric motor when it is determined that there is an abnormality in at least one of said self-monitoring function, and said monitor module.

16. A method of monitoring operation of computerized vehicular control functions, the method comprising: directing a signal indicative of a vehicle running state to a microprocessor configured to receive said signal; controlling a vehicle mounted actuator in accordance with a received input signal; commanding a self-monitor disposed within the microcomputer to determine whether or not said microcomputer is functioning properly based an said received input signal; monitoring the self-monitor using a digital circuit to determine whether or not said self-monitor is functioning properly, the digital circuit disposed within a monitor module device separate from said microcomputer and in communication with said microcomputer; counting up a clock using a reference counter disposed within said monitor module device, said clock serving as an operation reference of said digital circuit; monitoring said monitor module device using a module monitoring section, the module monitoring section configured to determine whether or not said monitor module device is functioning properly by taking in a count value of said reference counter at regular time intervals and judging that said monitor module device is not functioning properly when count values taken in at regular successive time intervals do not change during a predetermined time period.

* * * * *